United States Patent
Kweon et al.

(10) Patent No.: US 10,977,983 B2
(45) Date of Patent: Apr. 13, 2021

(54) HEAD-UP DISPLAY DEVICE FOR VEHICLE

(71) Applicant: LG Electronics Inc., Seoul (KR)

(72) Inventors: Ohjin Kweon, Seoul (KR); Kyoungil Lee, Seoul (KR); Seunggyu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 16/079,778

(22) PCT Filed: Feb. 22, 2017

(86) PCT No.: PCT/KR2017/001928
§ 371 (c)(1),
(2) Date: Aug. 24, 2018

(87) PCT Pub. No.: WO2017/146452
PCT Pub. Date: Aug. 31, 2017

(65) Prior Publication Data
US 2019/0051233 A1    Feb. 14, 2019

Related U.S. Application Data

(60) Provisional application No. 62/300,273, filed on Feb. 26, 2016.

(30) Foreign Application Priority Data

Feb. 3, 2017   (KR) .................. 10-2017-0015571

(51) Int. Cl.
*G09G 3/32* (2016.01)
*G02B 27/00* (2006.01)
(Continued)

(52) U.S. Cl.
CPC ............... *G09G 3/32* (2013.01); *B60K 35/00* (2013.01); *G02B 3/005* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2009/0135374 A1* | 5/2009 | Horiuchi | G02B 3/0062 353/13 |
| 2013/0127980 A1* | 5/2013 | Haddick | G02B 27/0093 348/14.08 |

(Continued)

FOREIGN PATENT DOCUMENTS

| | | |
|---|---|---|
| JP | 2007108429 | 4/2007 |
| JP | 2009164210 | 7/2009 |

(Continued)

OTHER PUBLICATIONS

Extended European Search Report in European Application No. 17756790.6, dated Oct. 28, 2019, 7 pages.

*Primary Examiner* — Kwin Xie
(74) *Attorney, Agent, or Firm* — Fish & Richarson P.C.

(57) ABSTRACT

Provided is a Head Up Display (HUD) device for a vehicle, the device including: a plurality of light emitting devices; an image forming panel configured to generate an image based on light provided from the plurality of light emitting devices and output the image; a lens system arranged between the plurality of light emitting devices and the image forming device and configured to transmit light generated by the plurality of light emitting devices to the image forming panel; and a processor configured to control the plurality of light emitting devices and the image forming panel, wherein each of the plurality of light emitting devices is mounted to a circuit board by direct bonding.

20 Claims, 27 Drawing Sheets

(51) Int. Cl.

| | | |
|---|---|---|
| *G02B 3/00* | (2006.01) | |
| *G02B 27/09* | (2006.01) | |
| *G02B 27/10* | (2006.01) | |
| *G02B 27/12* | (2006.01) | |
| *G03B 21/20* | (2006.01) | |
| *B60K 35/00* | (2006.01) | |
| *G02B 19/00* | (2006.01) | |
| *G02B 27/01* | (2006.01) | |
| *G05D 1/02* | (2020.01) | |

(52) U.S. Cl.
CPC ..... *G02B 19/0014* (2013.01); *G02B 19/0066* (2013.01); *G02B 27/0093* (2013.01); *G02B 27/0101* (2013.01); *G02B 27/0905* (2013.01); *G02B 27/0961* (2013.01); *G02B 27/1046* (2013.01); *G02B 27/123* (2013.01); *G03B 21/208* (2013.01); *G03B 21/2013* (2013.01); *B60K 2370/1529* (2019.05); *B60K 2370/332* (2019.05); *B60K 2370/334* (2019.05); *B60K 2370/52* (2019.05); *G02B 2027/014* (2013.01); *G02B 2027/0138* (2013.01); *G05D 1/0231* (2013.01); *G05D 1/0242* (2013.01); *G05D 1/0255* (2013.01); *G05D 1/0257* (2013.01); *G05D 2201/0213* (2013.01); *G09G 2380/10* (2013.01)

(56) References Cited

U.S. PATENT DOCUMENTS

2016/0147074 A1\* 5/2016 Kobayashi ........... G02B 3/0068
345/7
2018/0136463 A1\* 5/2018 Nambara ............... B60K 35/00

FOREIGN PATENT DOCUMENTS

| JP | 2009169399 | 7/2009 |
|---|---|---|
| JP | 2009175298 | 8/2009 |
| JP | 2011090217 | 5/2011 |
| JP | 2015099186 | 5/2015 |
| KR | 1020140008425 | 1/2014 |
| KR | 1020140124488 | 10/2014 |

\* cited by examiner

【FIG. 1】
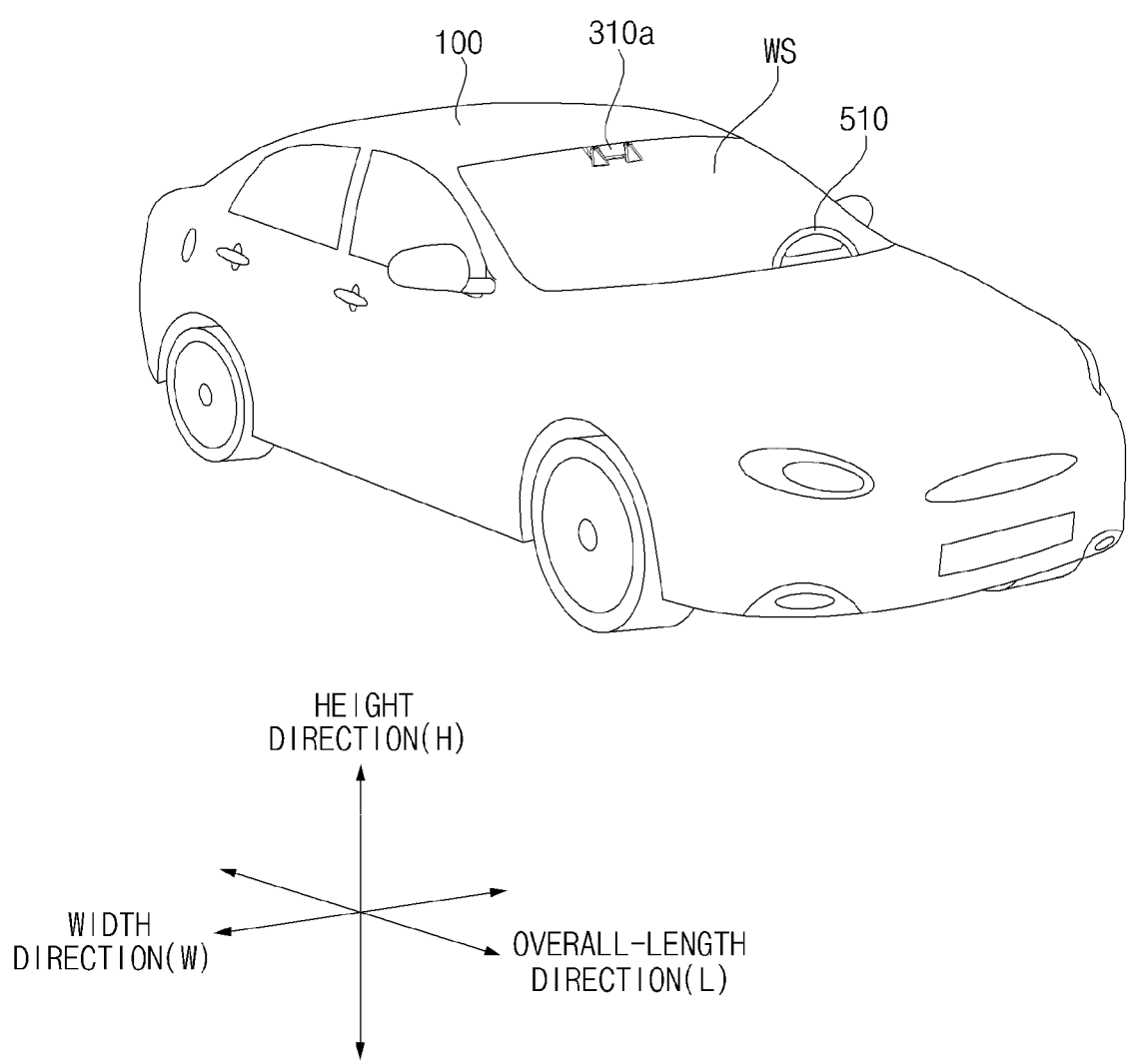

[FIG. 2]
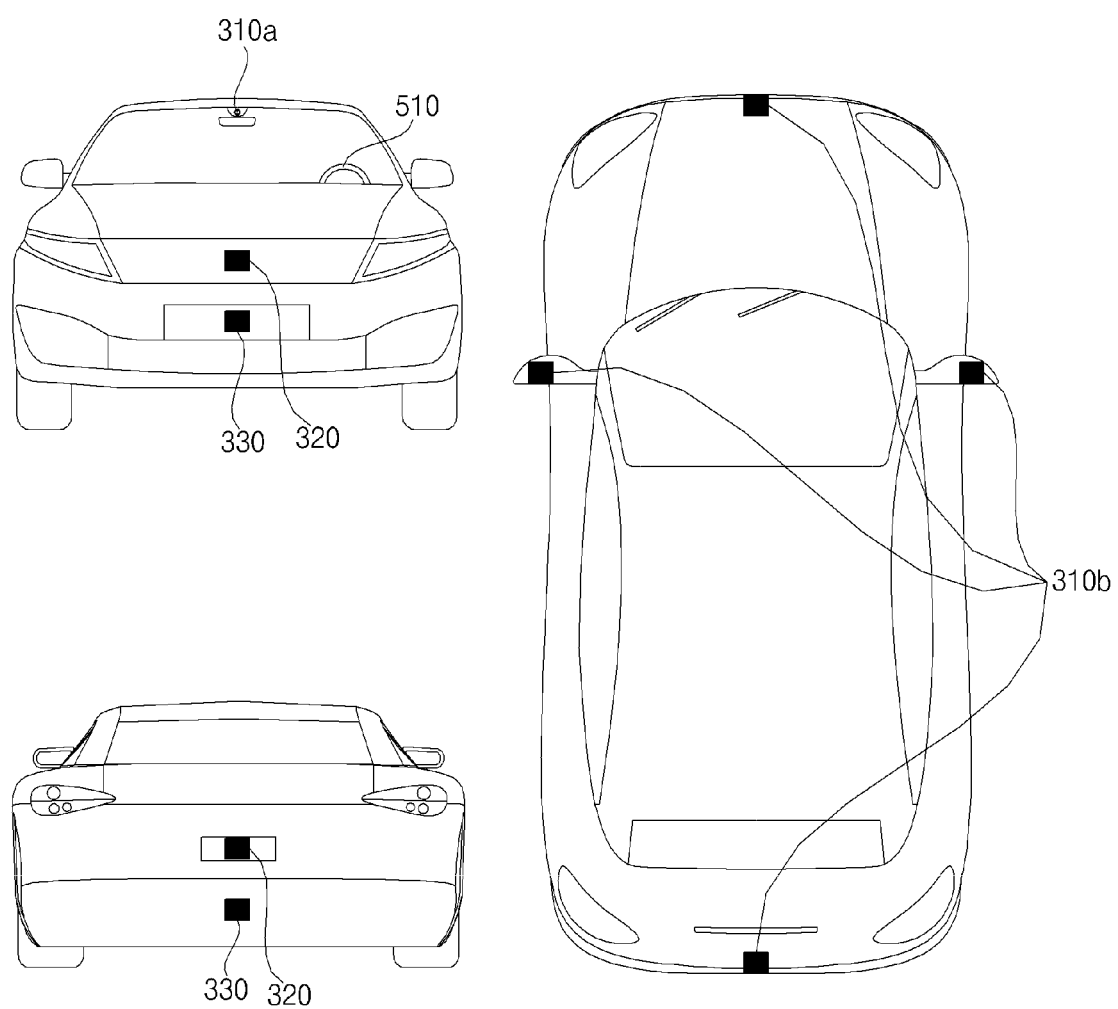

[FIG. 3]
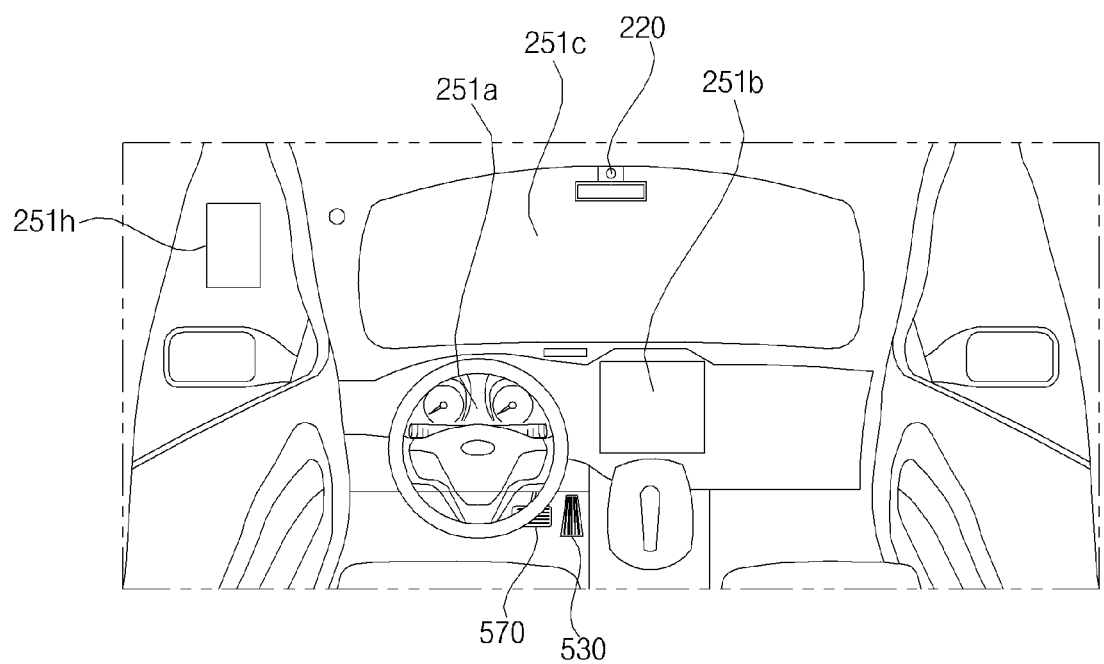

[FIG. 4]
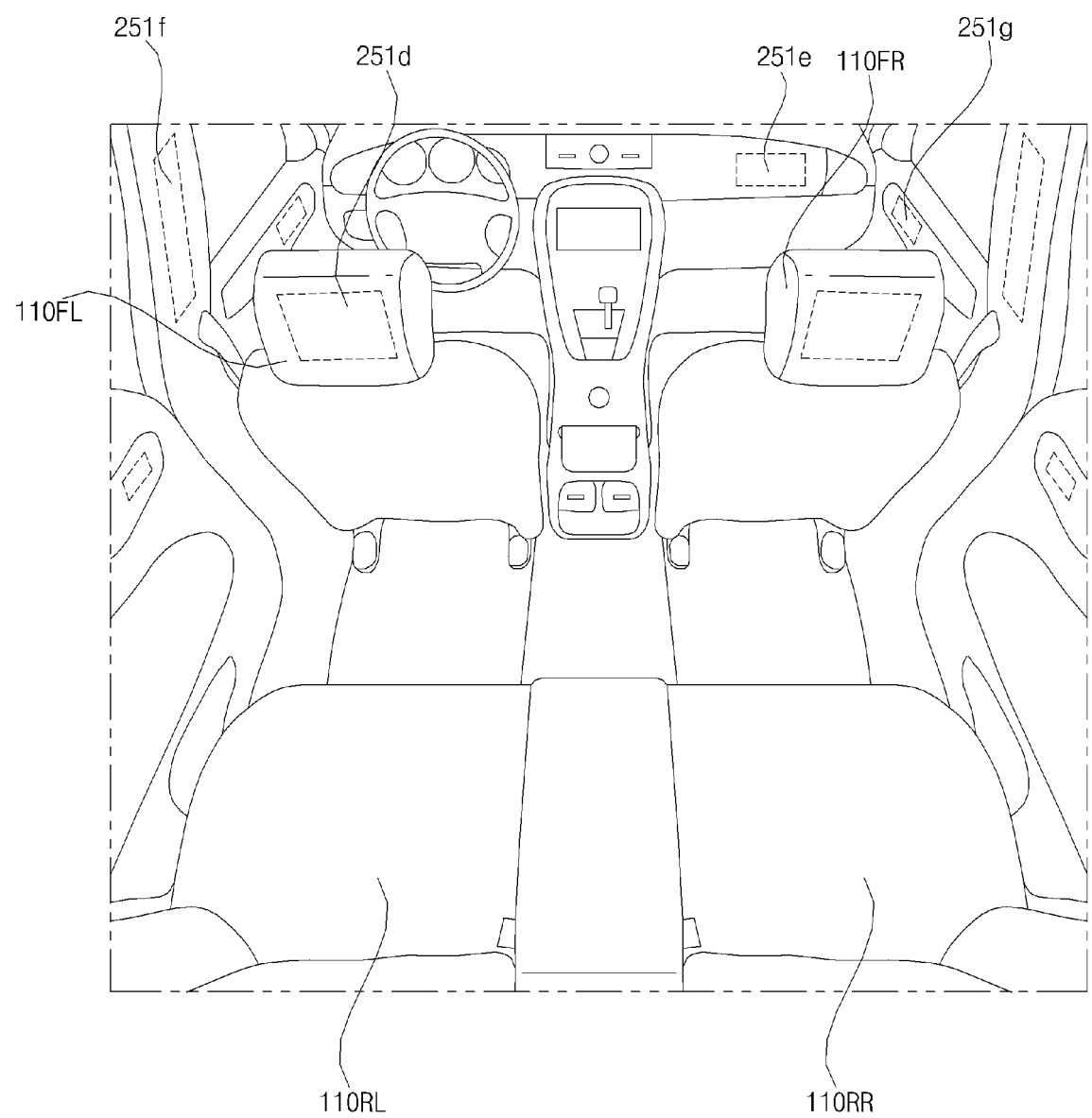

[FIG. 5]
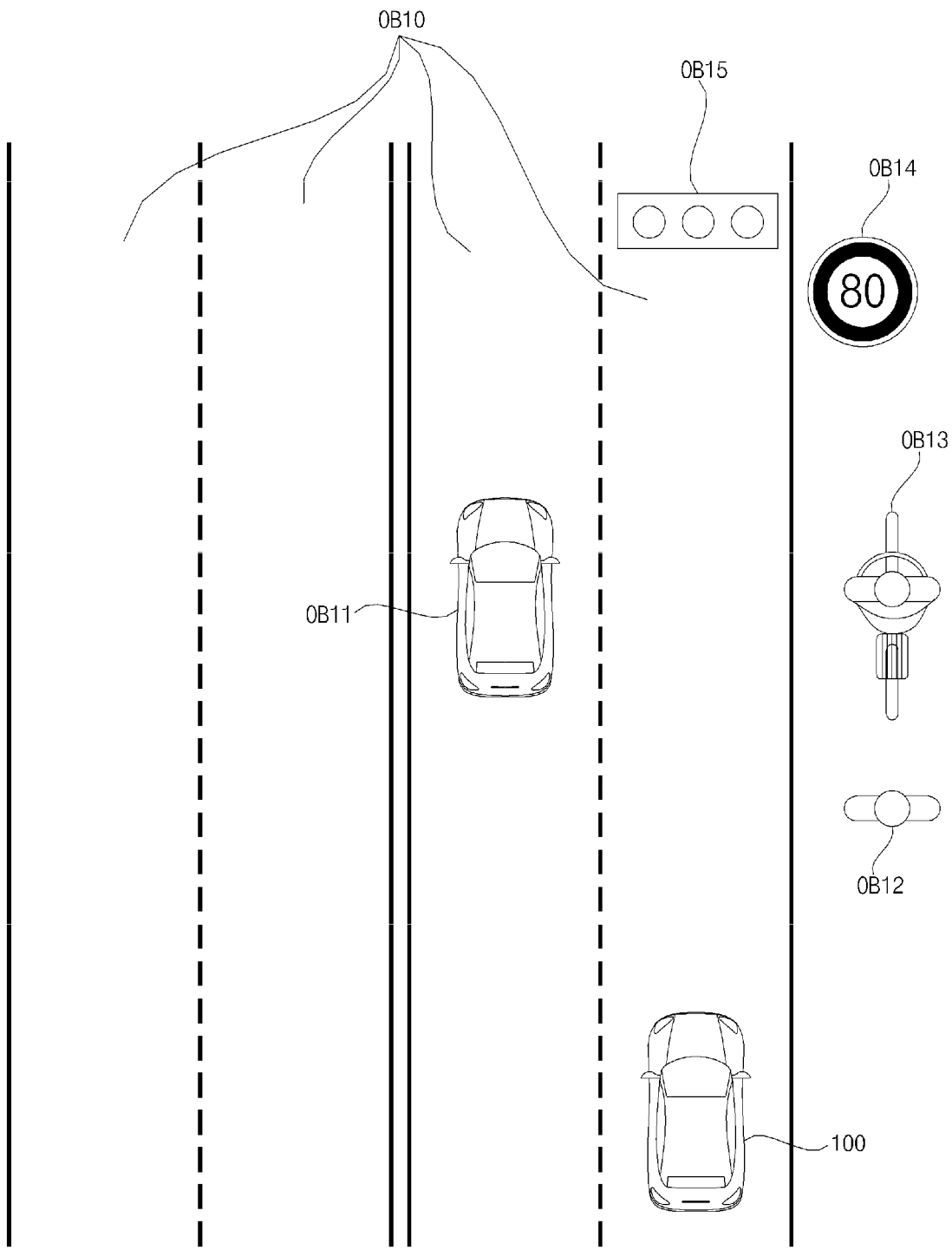

[FIG. 6]
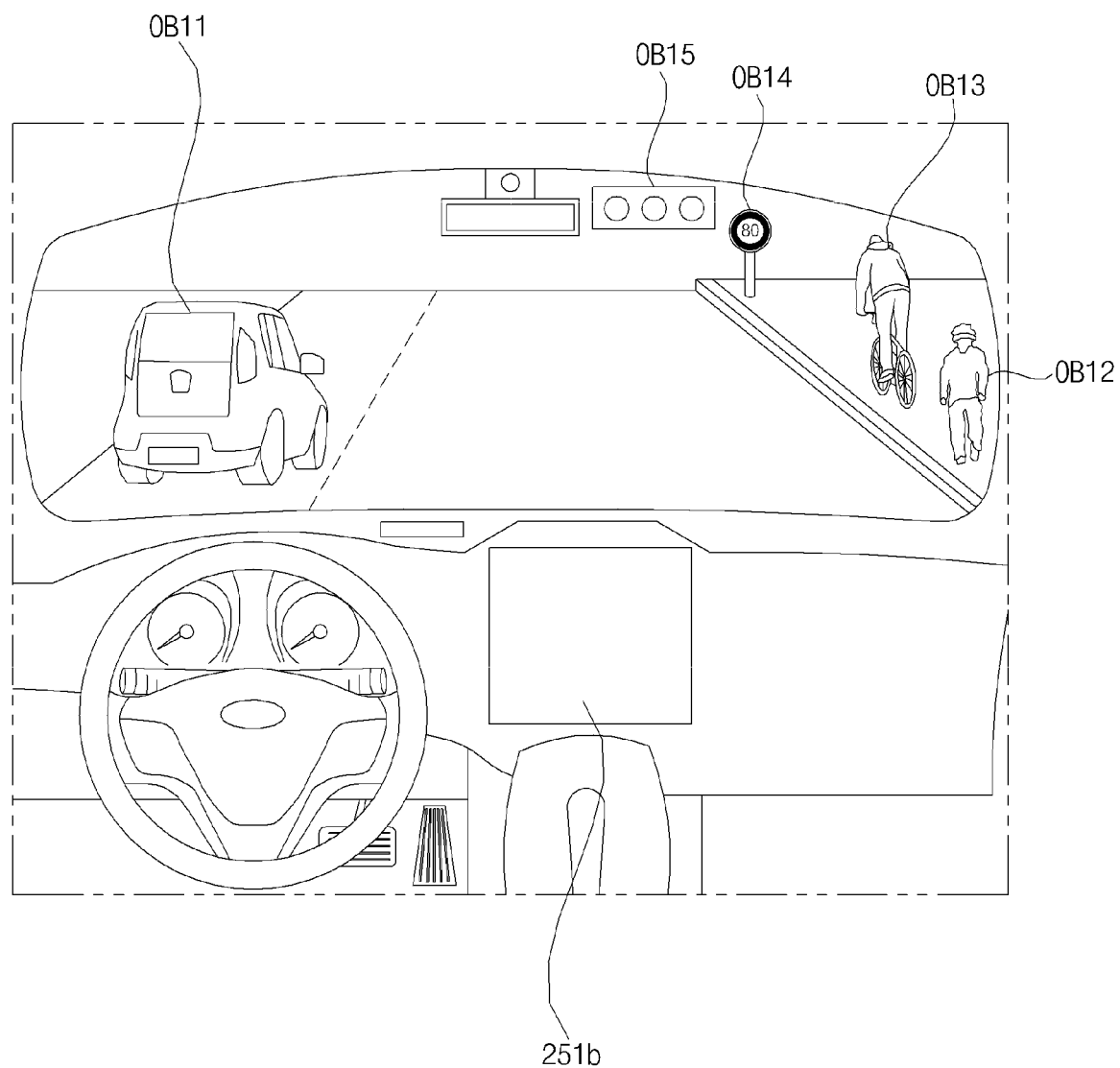

[FIG. 7]
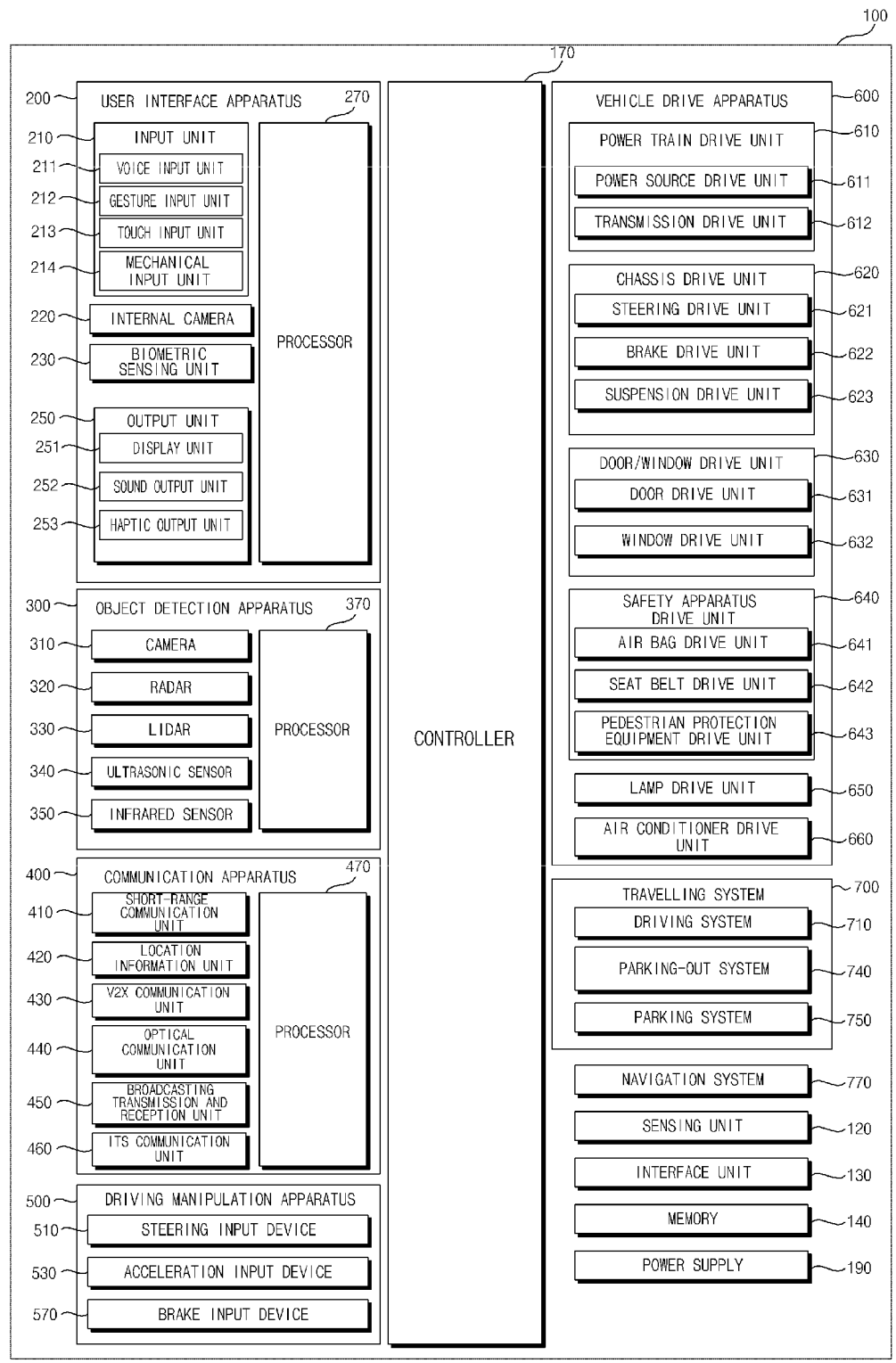

[FIG. 8A]
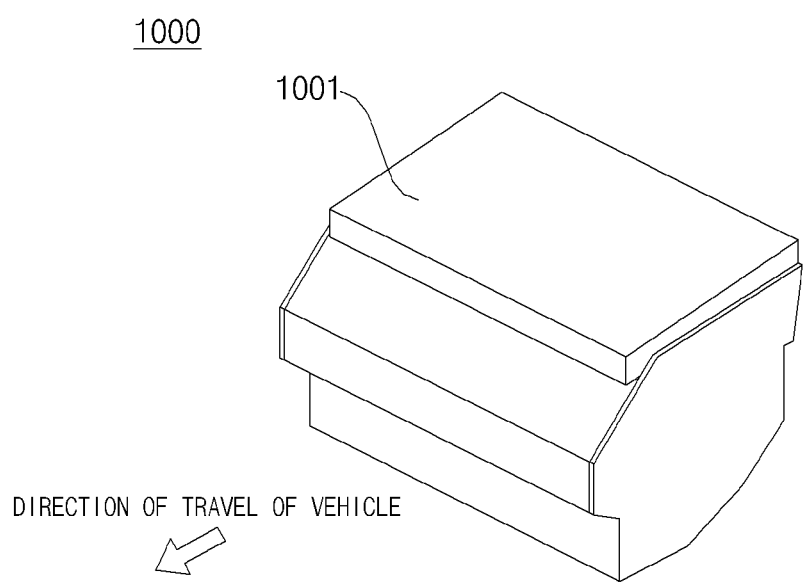

[FIG. 8B]
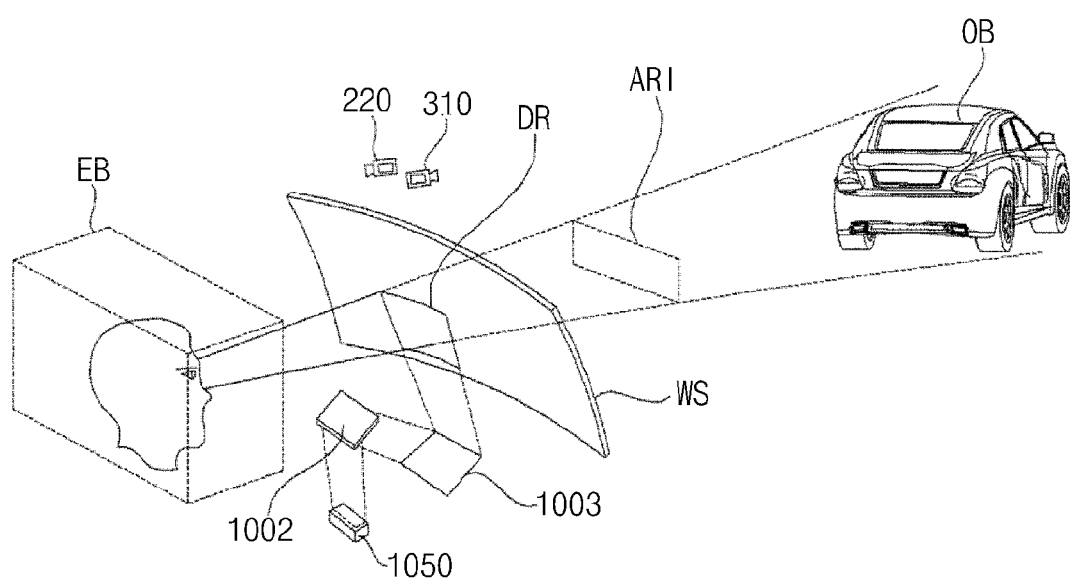

[FIG. 8C]
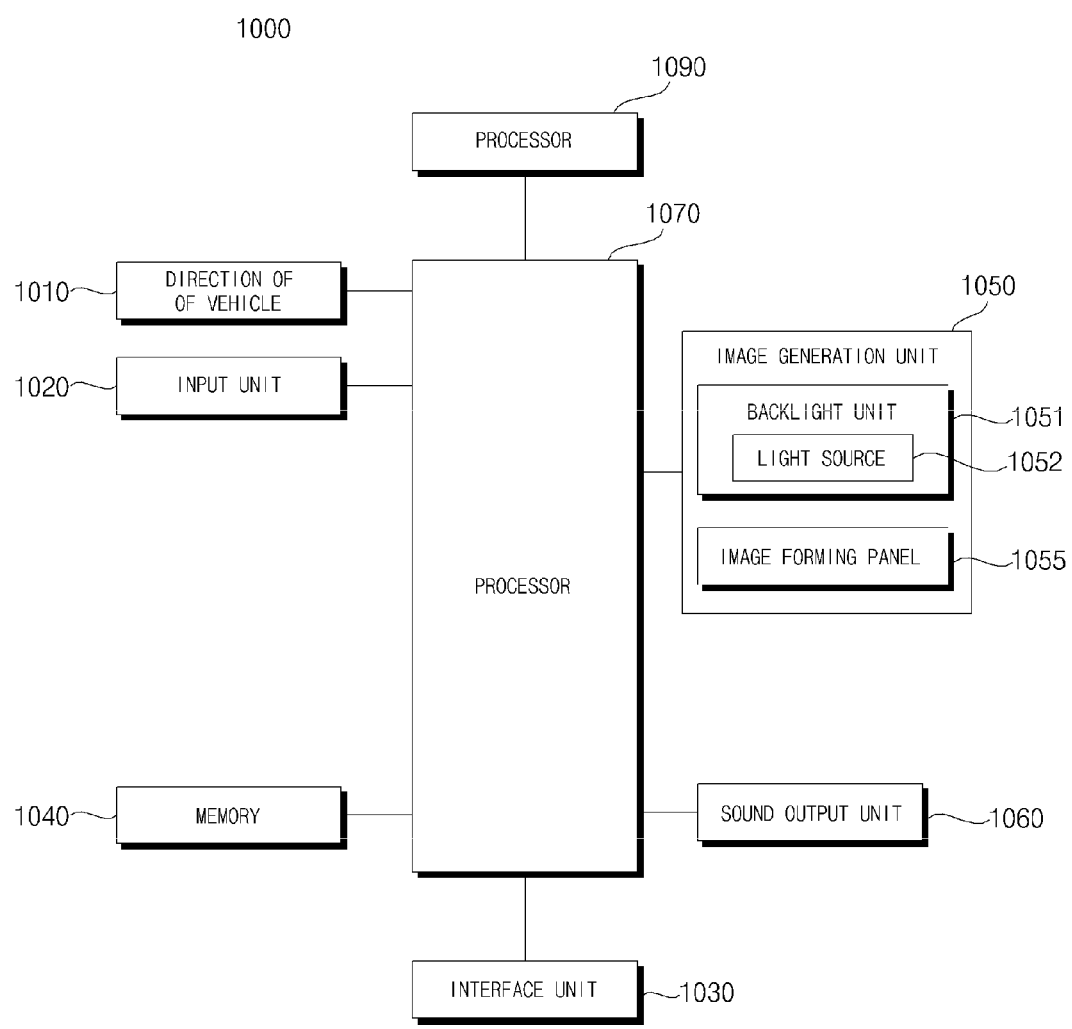

[FIG. 9A]
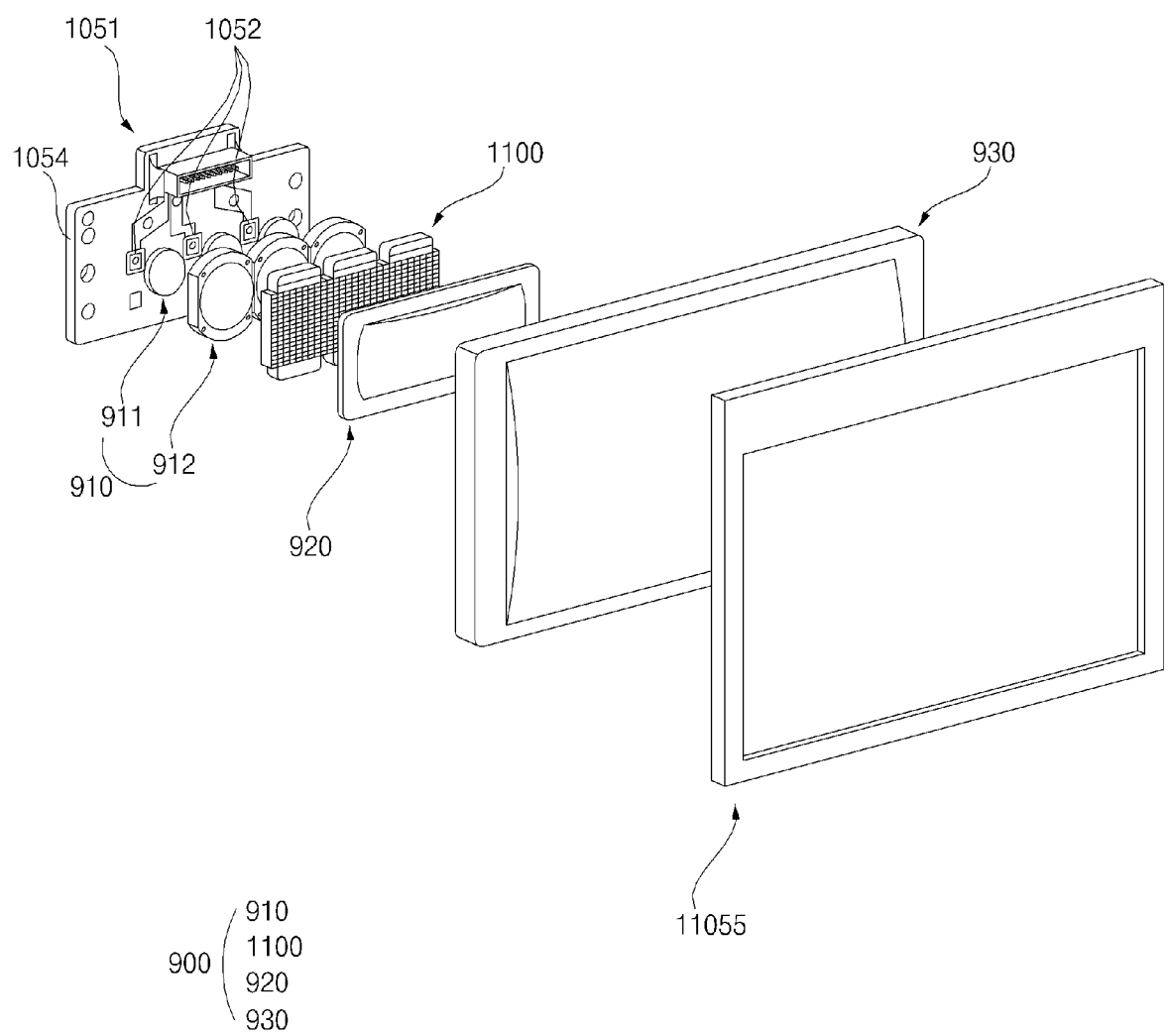

[FIG. 9B]
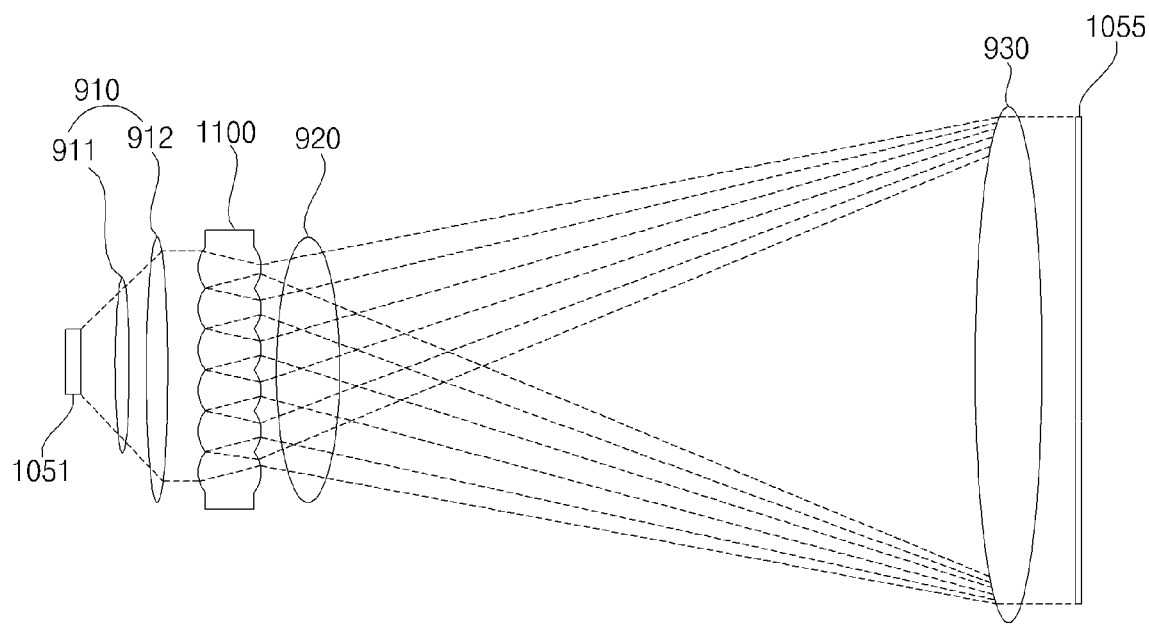

[FIG. 10]
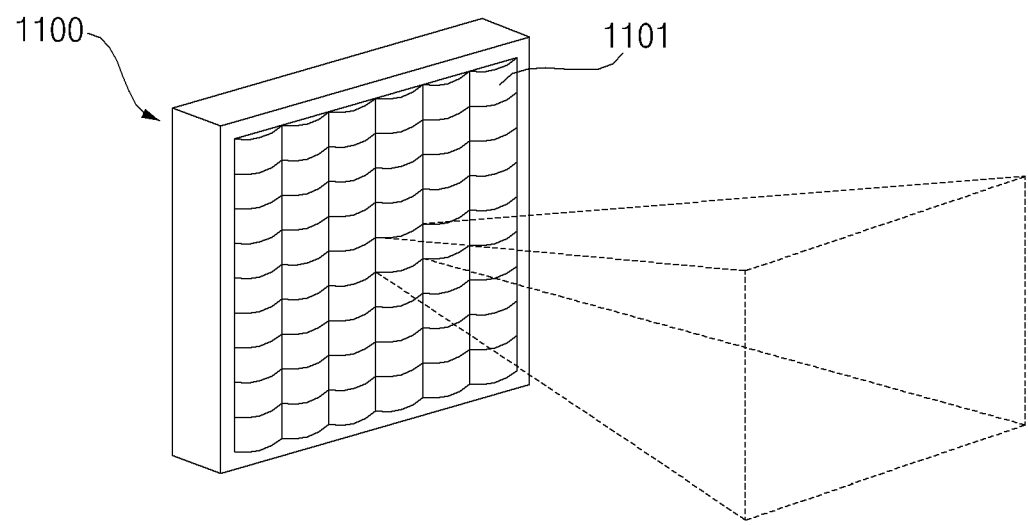

[FIG. 11]
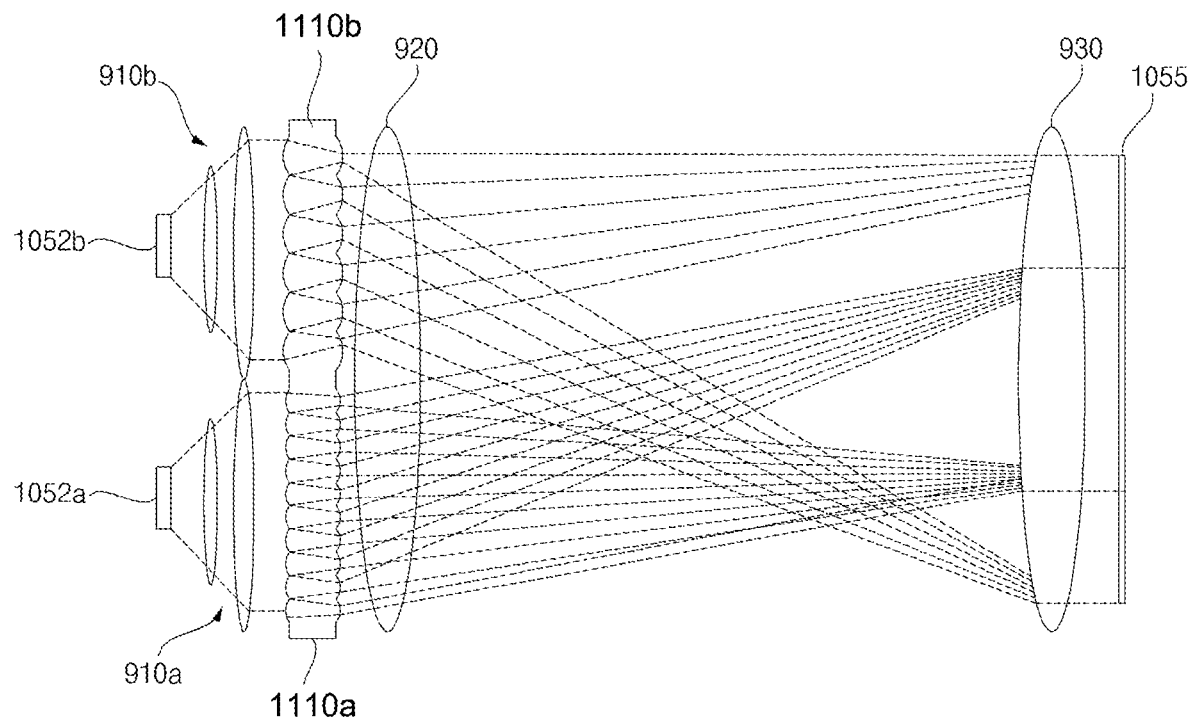
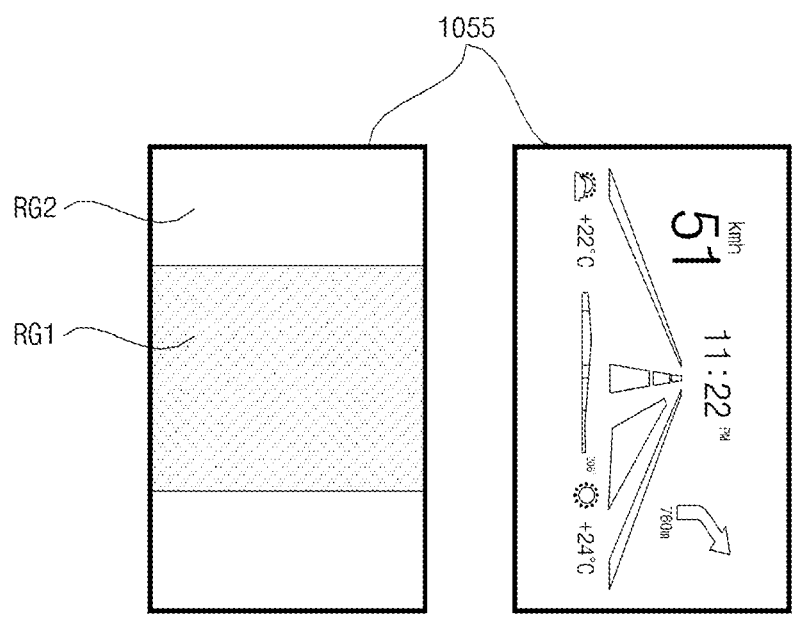

[FIG. 12]
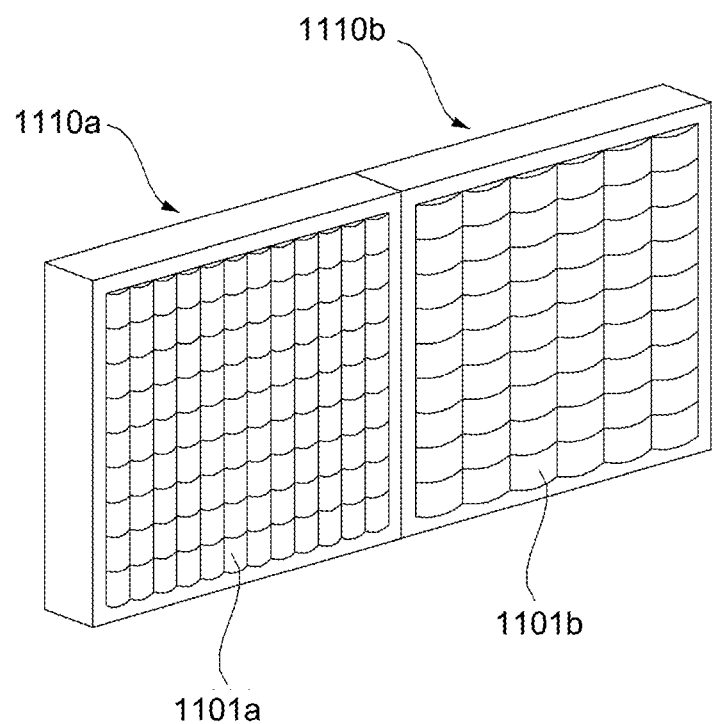

[FIG. 13]
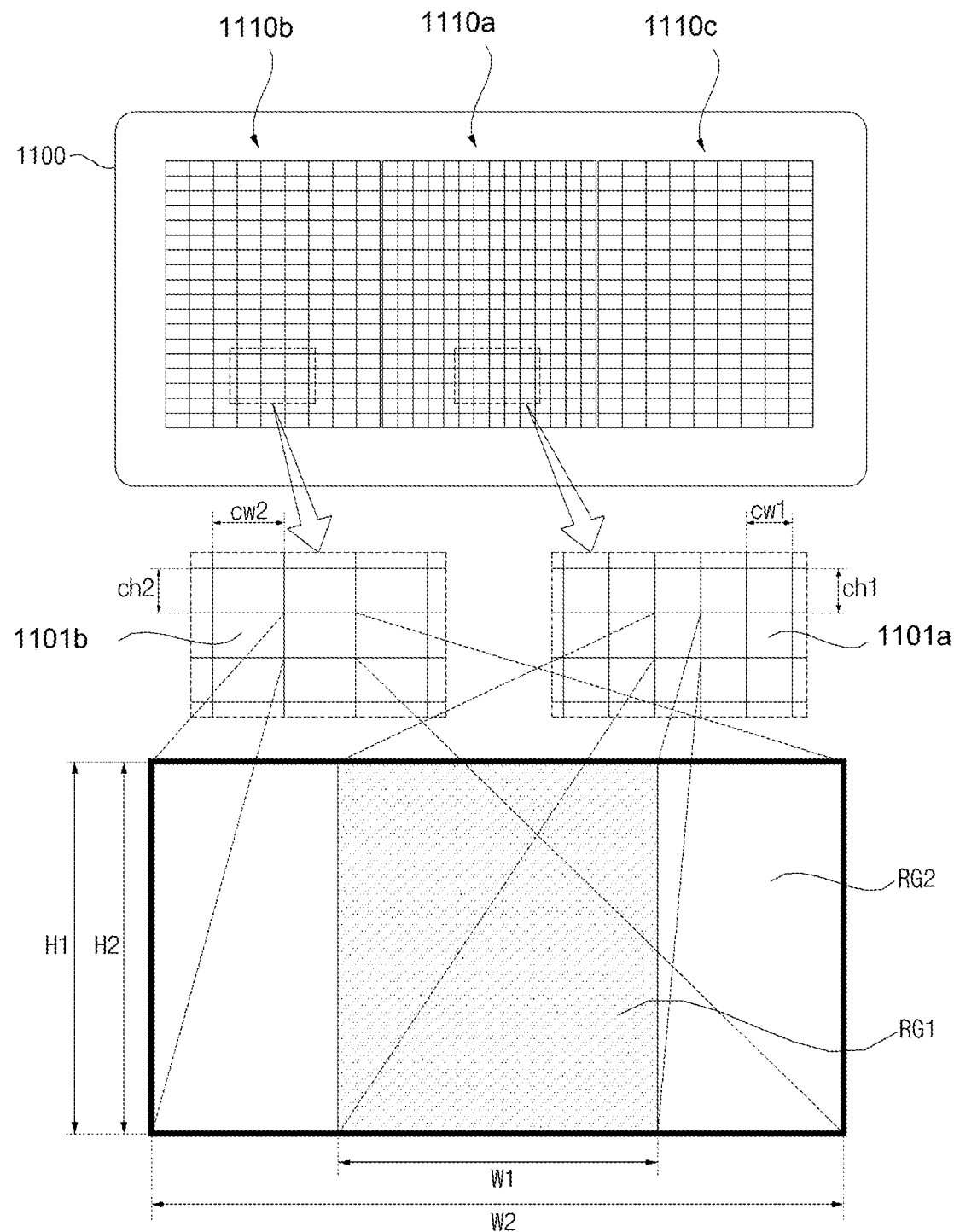

【FIG. 14】
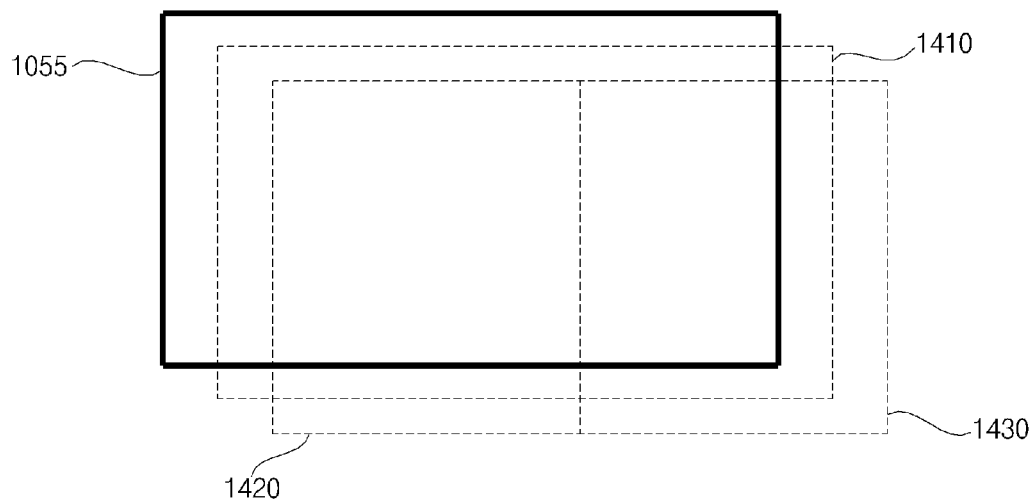
(a)
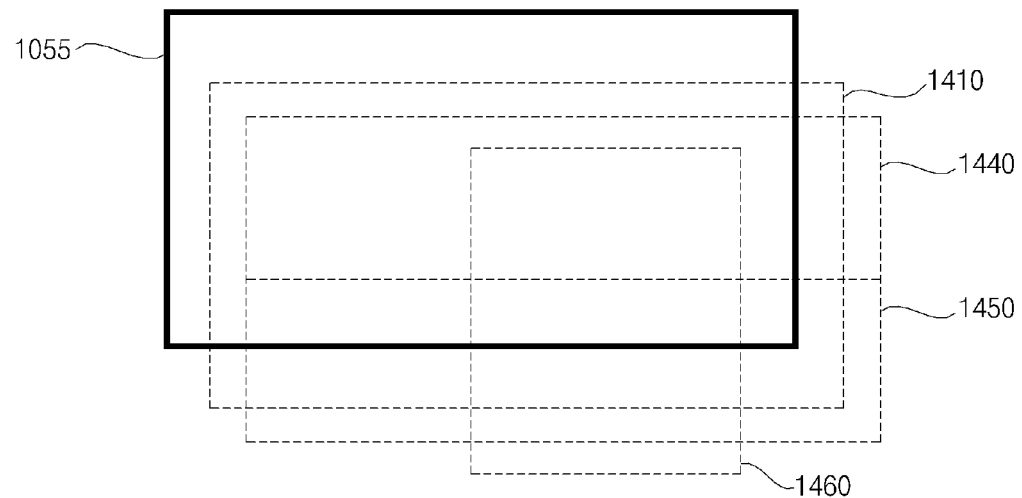
(b)

[FIG. 15A]
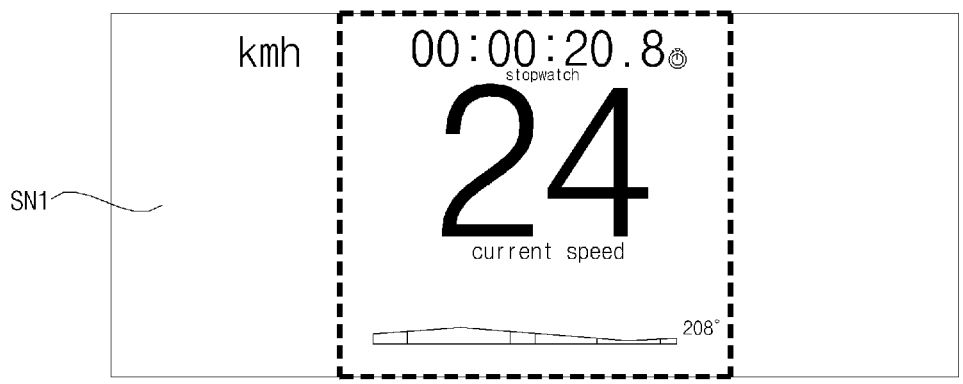
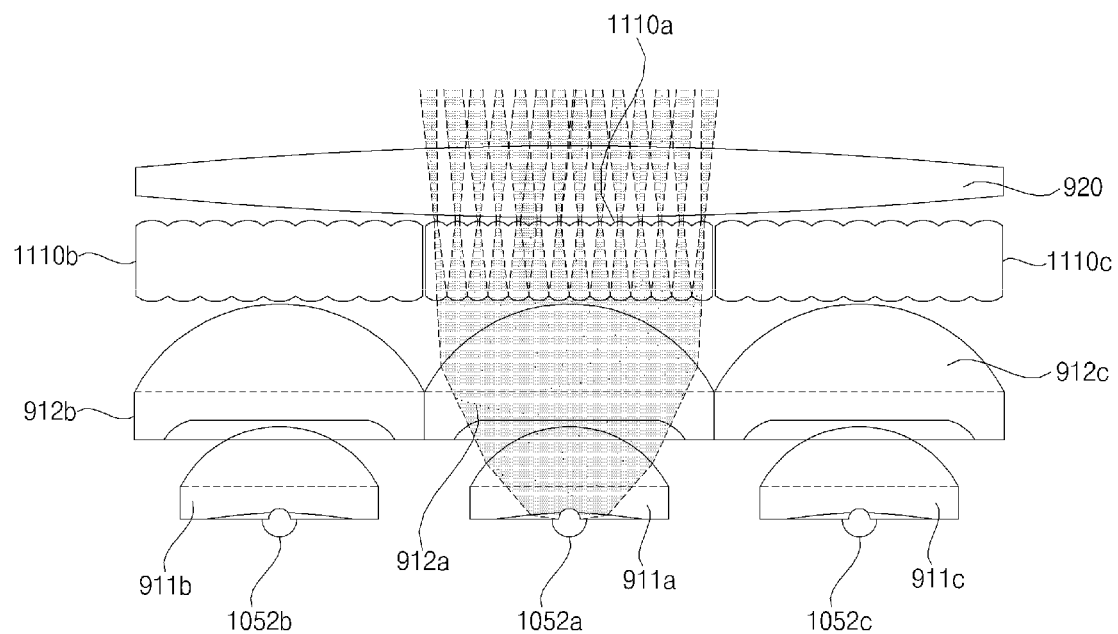

[FIG. 15B]
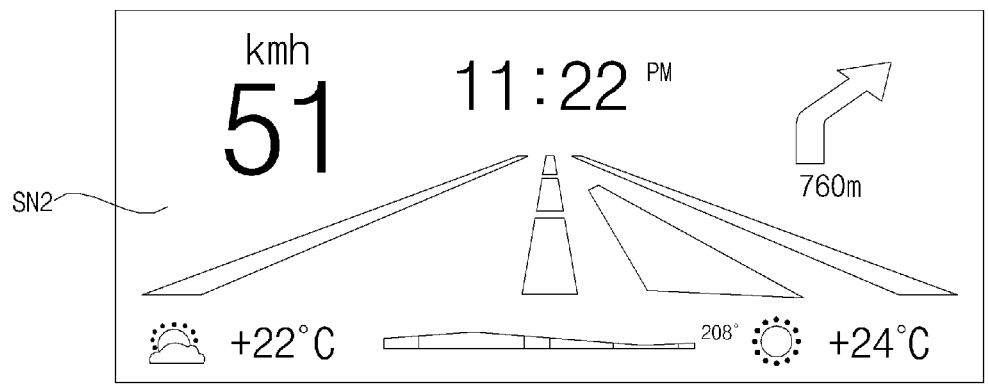
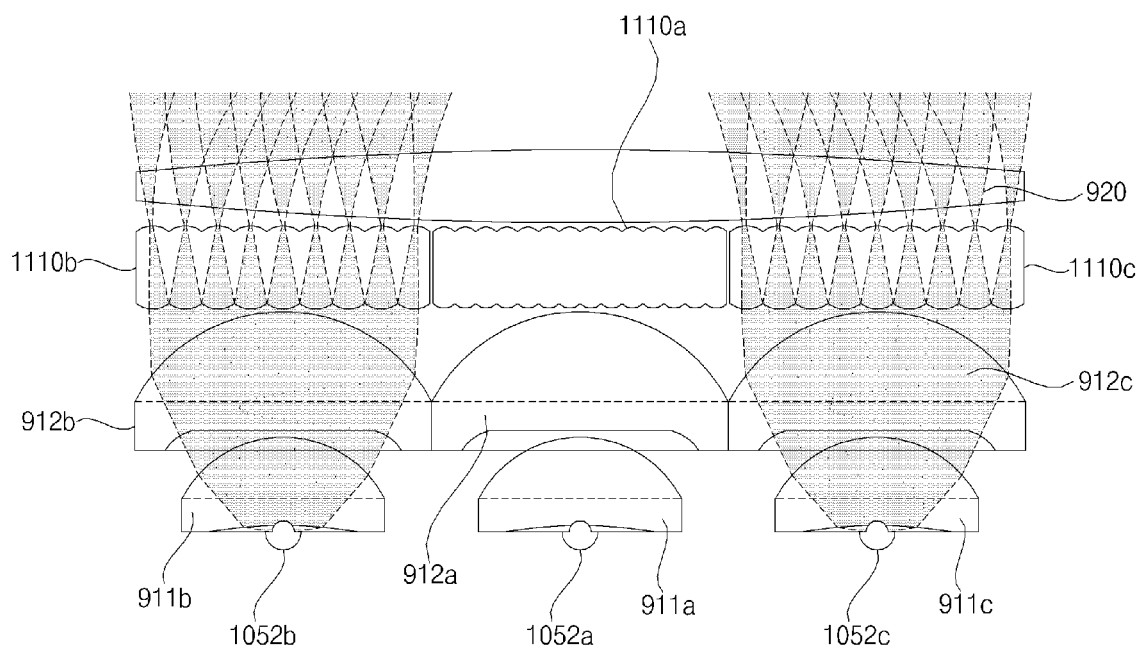

[FIG. 15C]
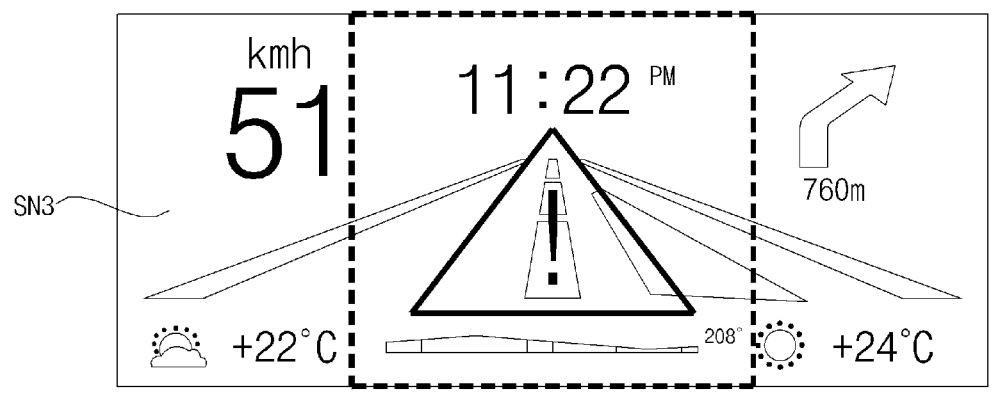
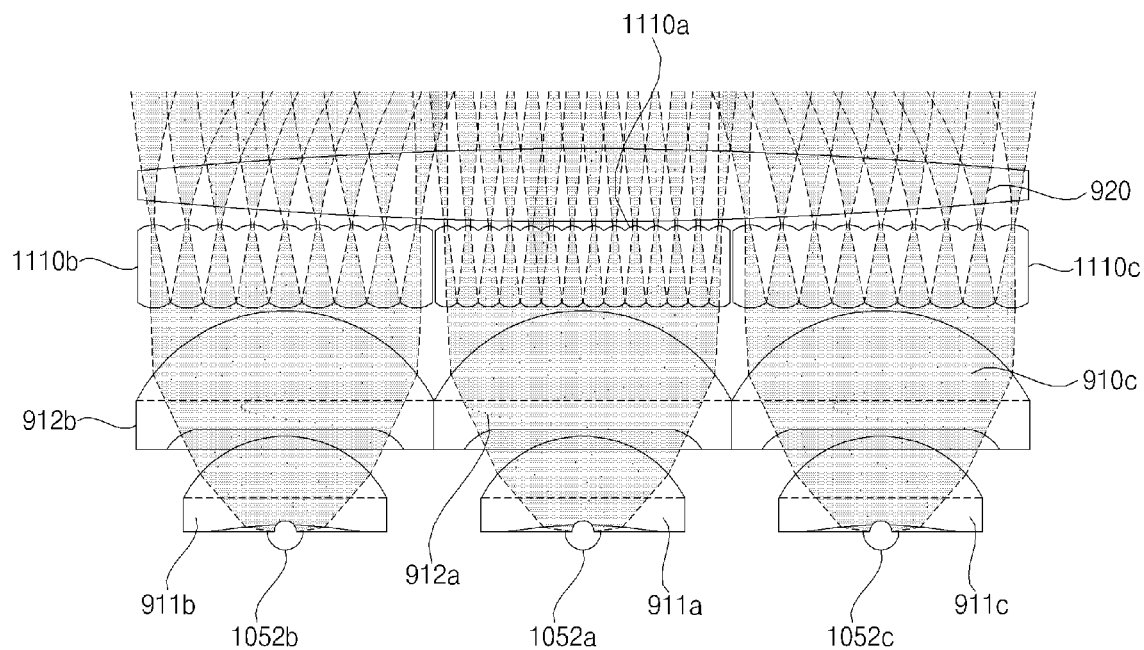

【FIG. 16】
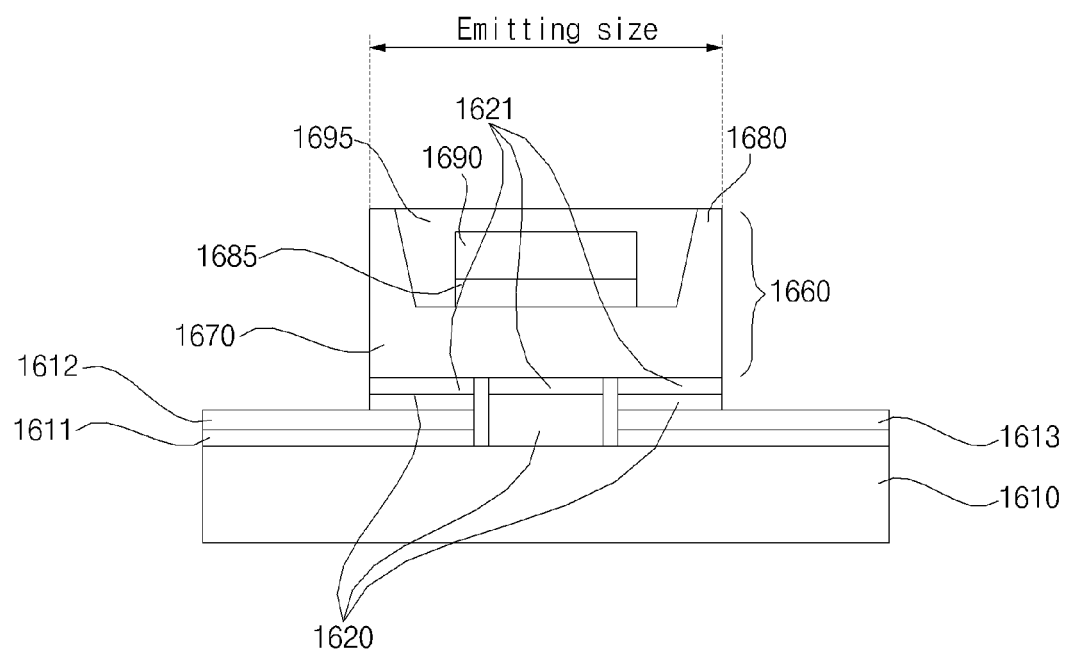

[FIG. 17]
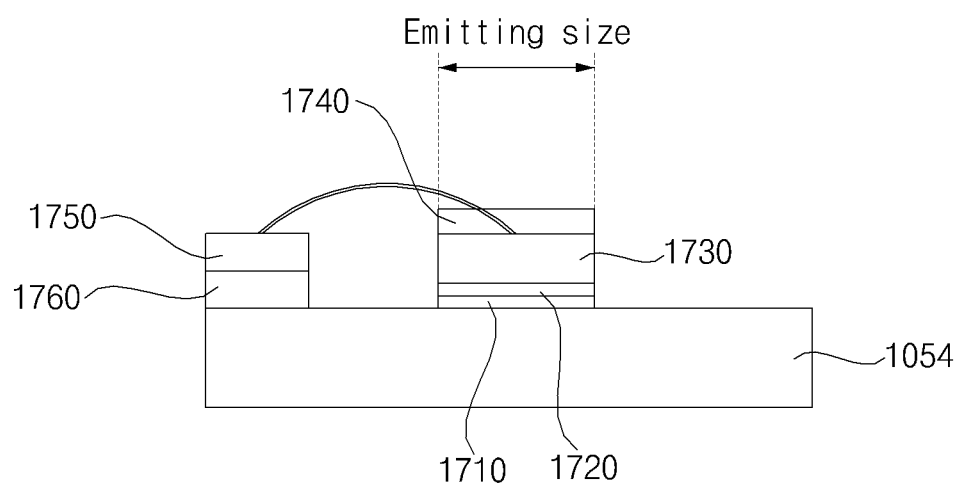

[FIG. 18]
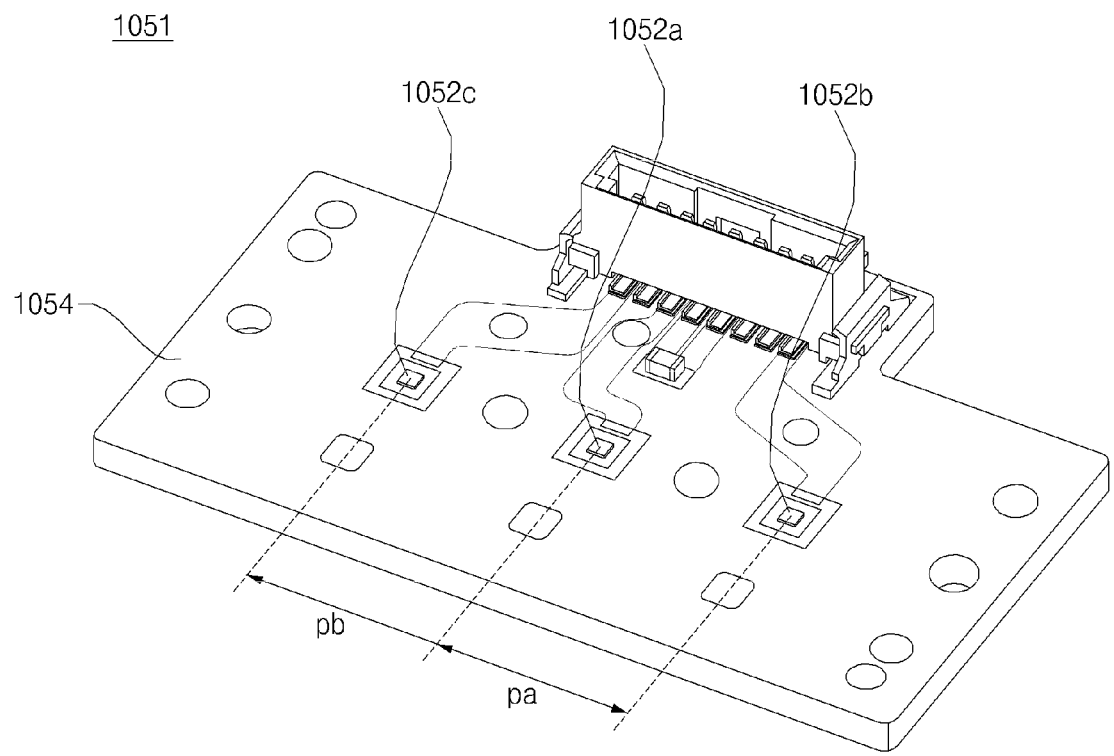

[FIG. 19]
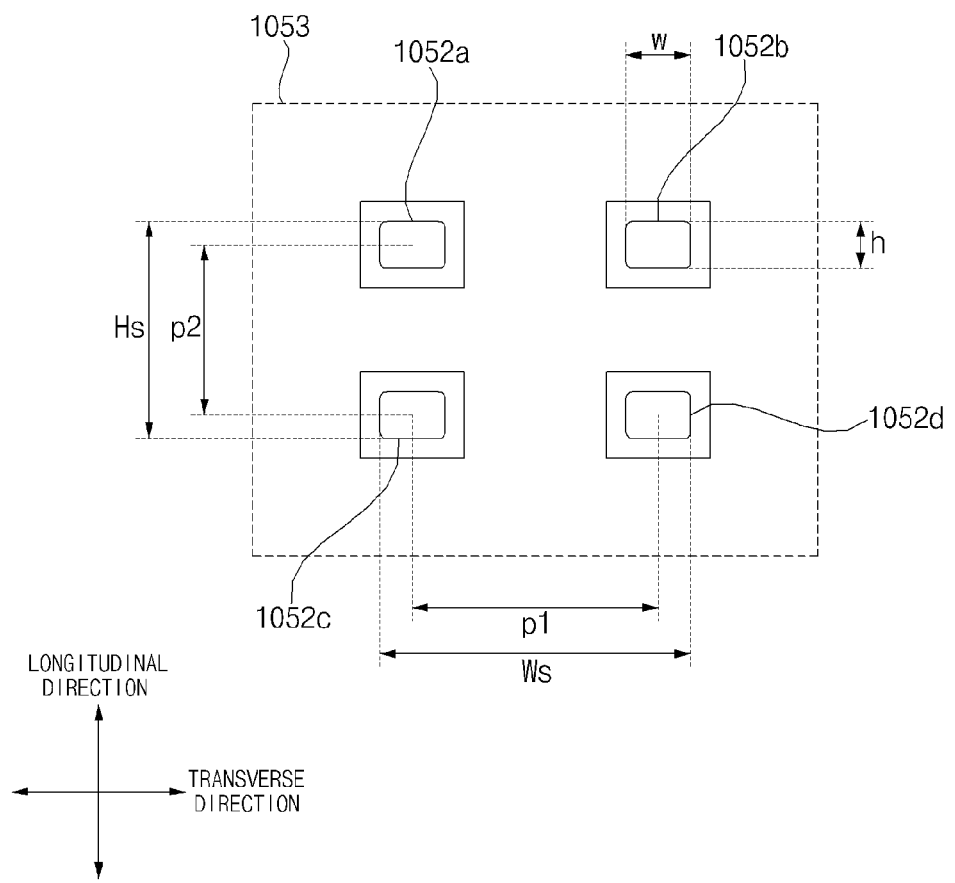
LONGITUDINAL DIRECTION
TRANSVERSE DIRECTION
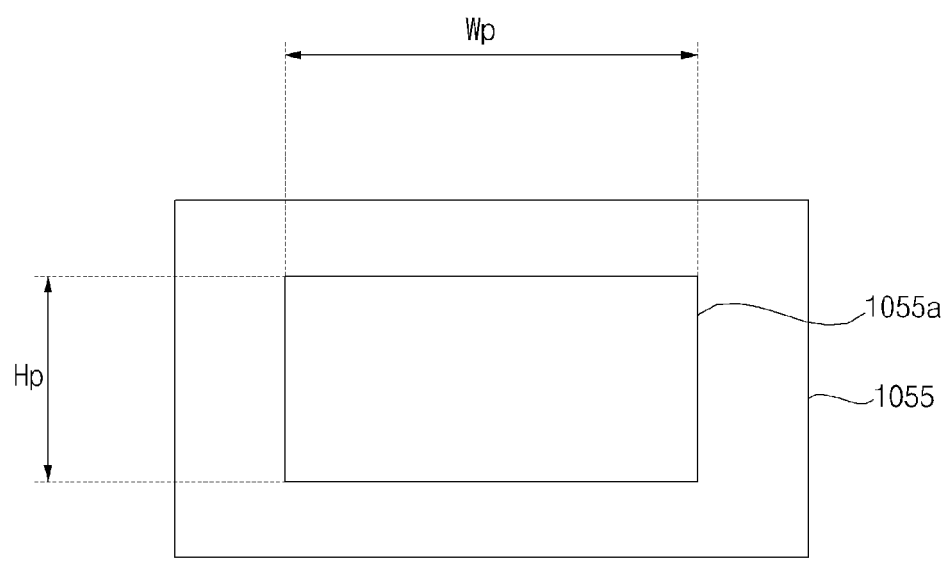

【FIG. 20A】
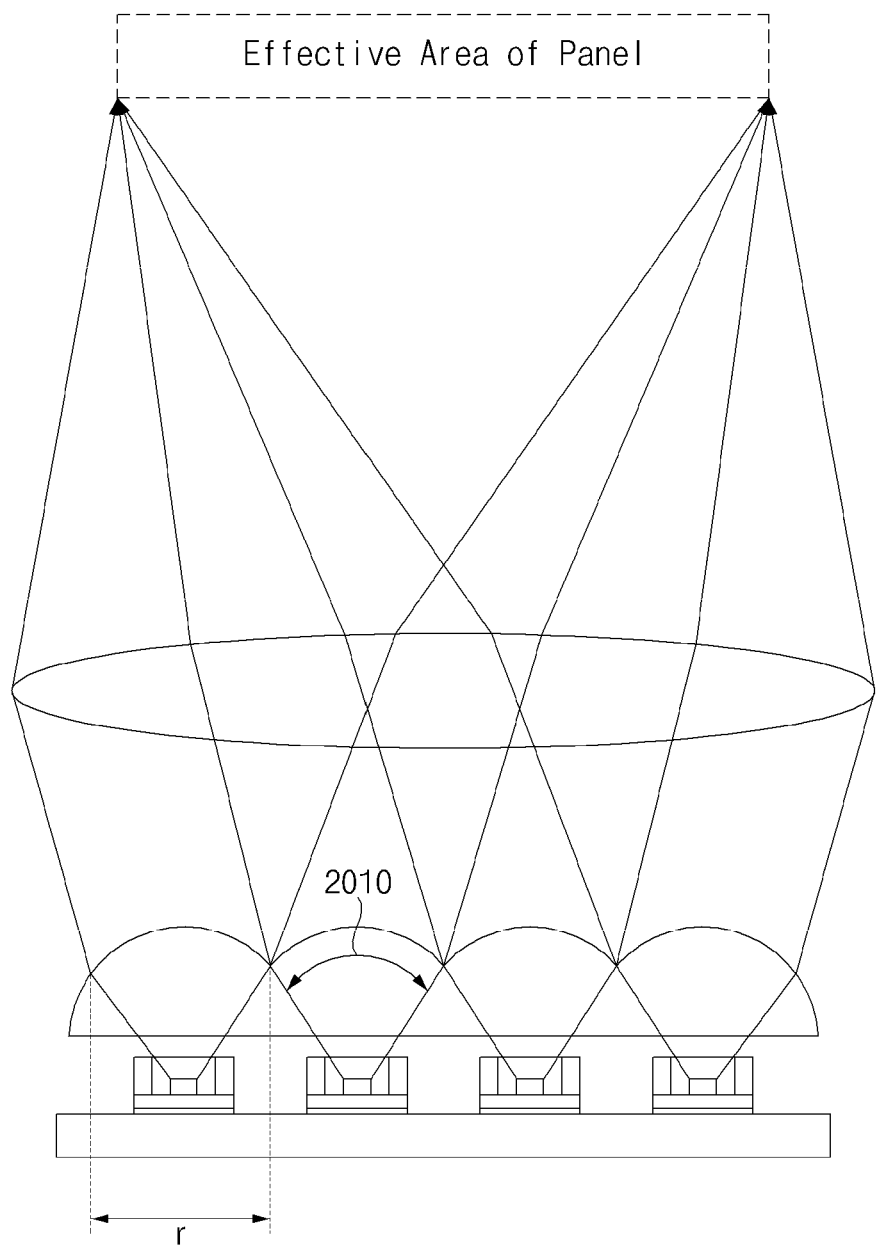

【FIG. 20B】
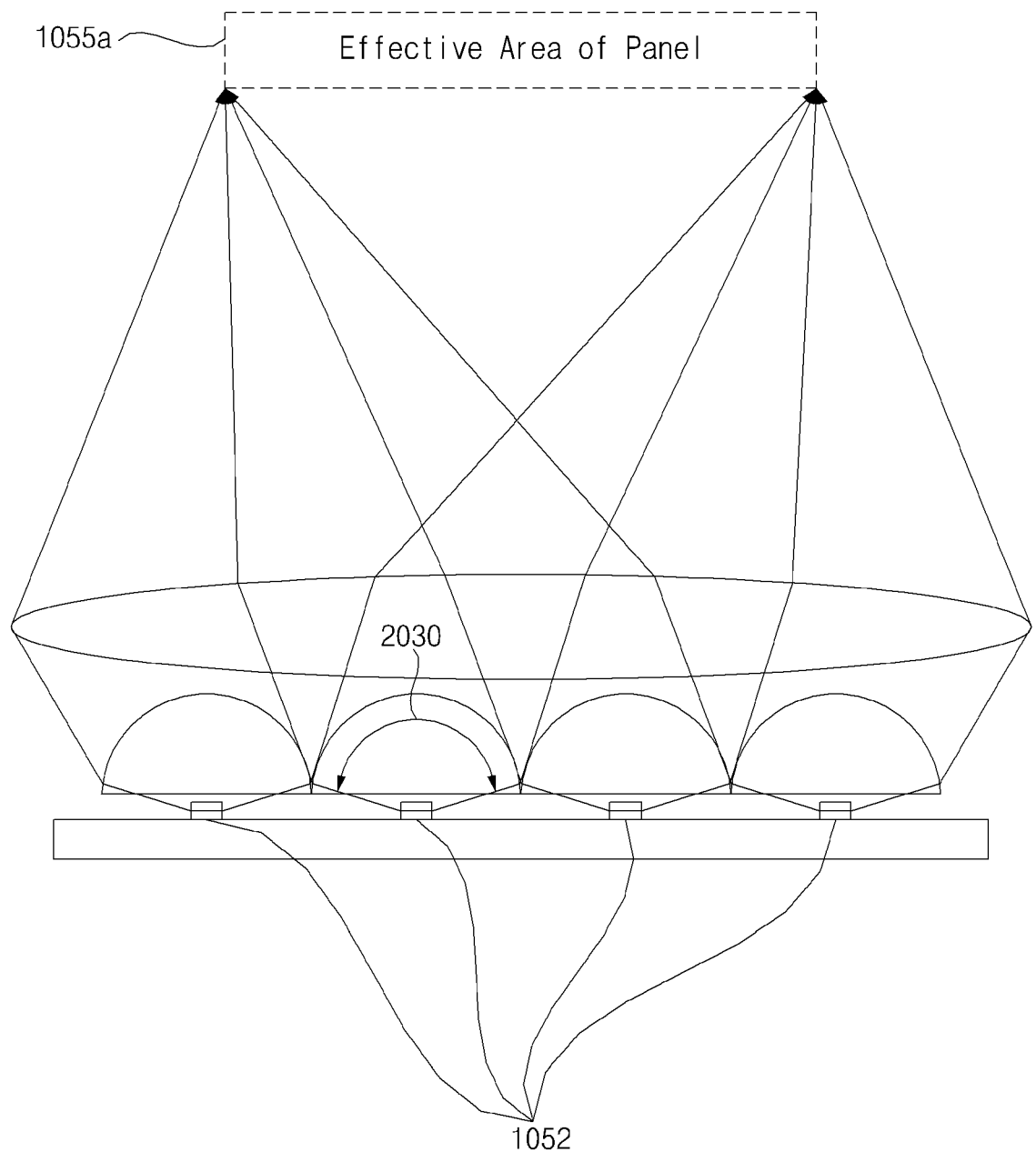

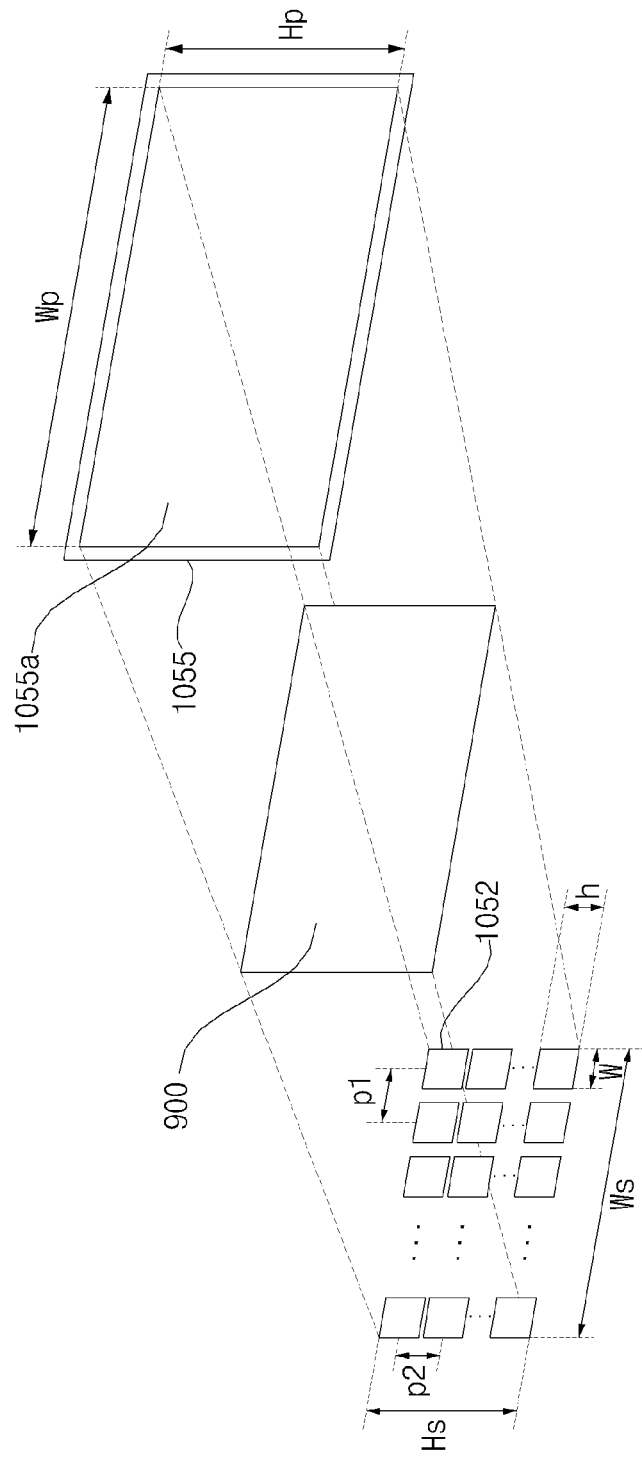
[FIG. 21]

HEAD-UP DISPLAY DEVICE FOR VEHICLE

CROSS-REFERENCE TO RELATED APPLICATIONS

This application is a National Stage application under 35 U.S.C. § 371 of International Application No. PCT/KR2017/001928, filed on Feb. 22, 2017, which claims the benefit of Korean Application No. 10-2017-0015571, filed on Feb. 3, 2017, and U.S. Application No. 62/300,273, filed on Feb. 26, 2016. The disclosures of the prior applications are incorporated by reference in their entirety.

TECHNICAL FIELD

The present invention relates to a Head Up Display (HUD) device

BACKGROUND ART

A vehicle is an apparatus that moves in a direction desired by a user riding therein. A typical example of the vehicle may be an automobile.

Meanwhile, a variety of sensors and electronic devices have been mounted in vehicles for the convenience of a user who uses the vehicle. In particular, for user driving convenience, an Advanced Driver Assistance System (ADAS) has been actively studied. In addition, efforts have been vigorously making to develop autonomous vehicles.

Meanwhile, it is necessary to develop a variety of devices for interface between the a vehicle and a user. In particular, efforts is being made to research a Head Up Display (HUD) device in which a picture is implemented on a windshield to allow a user to recognize information while driving.

Such a HUD device displays an image using a light source, but a HUD device according to a related art has a problem of low system efficiency.

In particular, a lens system in the HUD device according to the related art is not able to efficiently use light generated by light emitting devices.

DISCLOSURE

Technical Problem

To solve the aforementioned problem, the present invention provides a Head Up Display (HUD) device of which system efficiency, especially, optical efficiency, has improved.

Objects of the present invention should not be limited to the aforementioned objects and other unmentioned objects will be clearly understood by those skilled in the art from the following description.

Technical Solution

In accordance with an embodiment of the present invention, the above and other objects can be accomplished by the provision of a Head Up Display (HUD) device for a vehicle, the device including: a plurality of light emitting devices; an image forming panel configured to generate an image based on light provided from the plurality of light emitting devices and output the image; a lens system arranged between the plurality of light emitting devices and the image forming device and configured to transmit light generated by the plurality of light emitting devices to the image forming panel; and a processor configured to control the plurality of light emitting devices and the image forming panel, wherein each of the plurality of light emitting devices is mounted to a circuit board by direct bonding.

The details of other embodiments are included in the following description and the accompanying drawings.

Advantageous Effects

The embodiments of the present invention have one or more effects as follows.

First, it is possible to apply local dimming when necessary.

Second, it is possible to reduce power consumption and increase energy efficiency.

Third, it is possible to increase optical efficiency.

Fourth, it is possible to implement a picture uniformly.

Third, it is advantageous in heat treatment of a light source.

Effects of the present invention should not be limited to the aforementioned effects and other unmentioned effects will be clearly understood by those skilled in the art from the claims.

DESCRIPTION OF DRAWINGS

FIG. 1 is a view of the external appearance of a vehicle according to an embodiment of the present invention.

FIG. 2 is different angled views of a vehicle according to an embodiment of the present invention.

FIGS. 3 and 4 are views of the internal configuration of a vehicle according to an embodiment of the present invention.

FIGS. 5 and 6 are views referred to for explaining objects according to an embodiment of the present invention.

FIG. 7 is a block diagram referred to for explaining a vehicle according to an embodiment of the present invention.

FIG. 8A is a diagram illustrating an example of an exterior of a Head Up Display (HUD) device according to an embodiment of the present invention, and FIG. 8B is a conceptual diagram referred to for explaining a HUD device according to an embodiment of the present invention. FIG. 8C is a block diagram of a HUD device according to an embodiment of the present invention.

FIGS. 9A and 9B are diagrams referred to for explaining an image generation unit included in a HUD device according to an embodiment of the present invention.

FIGS. 10 to 12 are diagram referred to for explaining a Fly Eye Lens (FEL) according to an embodiment of the present invention.

FIG. 13 is a diagram referred to for explaining an area of an image forming panel corresponding to a cell size of an FEL according to an embodiment of the present invention.

FIG. 14 is a diagram referred to for explaining various areas dependent on various optic patterns of an FEL in an image forming panel according to an embodiment of the present invention.

FIGS. 15A to 15C are exemplary diagrams referred to for explaining an operation of how a picture is implemented in a HUD device according to an embodiment of the present invention.

FIGS. 16 and 17 are diagrams referred to for explaining a light emitting device according to an embodiment of the present invention.

FIG. 18 is a diagram referred to for explaining a backlight unit according to an embodiment of the present invention.

FIGS. 19 to 21 are diagrams referred to for explaining a HUD device in the case where a plurality of light emitting devices forms an array according to an embodiment of the present invention.

BEST MODE

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present invention.

FIG. 2 is different angled views of a vehicle according to an embodiment of the present invention.

FIGS. 3 and 4 are views of the internal configuration of a vehicle according to an embodiment of the present invention.

FIGS. 5 and 6 are views referred to for explaining objects according to an embodiment of the present invention.

FIG. 7 is a block diagram referred to for explaining a vehicle according to an embodiment of the present invention.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may switch to an autonomous driving mode or a manual mode in response to a user input.

For example, in response to a user input received through a user interface apparatus 200, the vehicle 100 may switch from a manual mode to an autonomous driving mode, or vice versa.

The vehicle 100 may switch to the autonomous driving mode or to the manual mode based on driving situation information. The driving situation information may include at least one of the following: information on an object located outside the vehicle 100, navigation information, and vehicle state information.

For example, the vehicle 100 may switch from the manual mode to the autonomous driving mode, or vice versa, based on driving situation information generated by the object detection apparatus 300.

For example, the vehicle 100 may switch from the manual mode to the autonomous driving mode, or vice versa, based on driving situation information received through a communication apparatus 400.

The vehicle 100 may switch from the manual mode to the autonomous driving mode, or vice versa, based on information, data, and a signal provided from an external device.

When the vehicle 100 operates in the autonomous driving mode, the autonomous vehicle 100 may operate based on a travelling system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation apparatus 500. In response to the user input received through the driving manipulation apparatus 500, the vehicle 100 may operate.

The term "overall length" means the length from the front end to the rear end of the vehicle 100, the term "overall width" means the width of the vehicle 100, and the term "overall height" means the height from the bottom of the wheel to the roof.

In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface apparatus 200, the object detection apparatus

300, the communication apparatus 400, the driving manipulation apparatus 500, a vehicle drive apparatus 600, the travelling system 700, a navigation system 770, a sensing unit 120, an interface 130, a memory 140, a controller 170, and a power supply 190.

In some embodiments, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some embodiments, the user interface apparatus 200 may further include other components in addition to the aforementioned components, or may not include some of the aforementioned components.

The input unit 200 is configured to receive information from a user, and data collected in the input unit 120 may be analyzed by the processor 270 and then processed into a control command of the user.

The input unit 200 may be disposed inside the vehicle 100. For example, the input unit 200 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 200 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected into a windshield or a window.

The display unit 251 may include a transparent display. The transparent display may be attached on the windshield or the window.

The transparent display may display a preset screen with a preset transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface apparatus 200 may include a plurality of display units 251a to 251g.

The display unit 251 may be disposed in a region of a steering wheel, a region 521a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some embodiments, the user interface apparatus 200 may include a plurality of processors 270 or may not include the processor 270.

In the case where the user interface apparatus 200 does not include the processor 270, the user interface apparatus 200 may operate under control of the controller 170 or a processor of a different device inside the vehicle 100.

Meanwhile, the user interface apparatus 200 may be referred to as a display device for vehicle.

The user interface apparatus 200 may operate under control of the controller 170.

The object detection apparatus 300 is configured to detect an object outside the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane.

The nearby vehicle OB11 may be a vehicle that is travelling in the vicinity of the vehicle 100. The nearby vehicle OB11 may be a vehicle within a preset distance from the vehicle 100. For example, the nearby vehicle OB11 may be a vehicle that is preceding or following the vehicle 100.

The pedestrian OB12 may be a person located in the vicinity of the vehicle 100. The pedestrian OB12 may be a person within a preset distance from the vehicle 100. For example, the pedestrian OB12 may be a person on a sidewalk or on the roadway.

The two-wheeled vehicle OB12 is a vehicle located in the vicinity of the vehicle 100 and moves with two wheels. The two-wheeled vehicle OB13 may be a vehicle that has two wheels within a preset distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

Meanwhile, the object may be classified as a movable object or a fixed object. For example, the movable object may be a concept including another vehicle and a pedestrian. For example, the fixed object may be a concept including a traffic signal, a road, and a structure.

The object detection apparatus 300 may include a camera 310, a radar 320, a lidar 330, an ultrasonic sensor 340, an infrared sensor 350, and a processor 370.

In some embodiments, the object detection apparatus 300 may further include other components in addition to the aforementioned components, or may not include some of the aforementioned components.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one side window inside the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a position of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object located within a preset distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect and track an object based on acquired images. The processor 370 may, for example, calculate the distance to the object and the speed relative to the object.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some embodiments, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 does not include the processor 370, the object detection apparatus 300 may operate under control of the controller 170 or a processor inside the vehicle 100.

The object detection apparatus 300 may operate under control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, and a processor 470.

In some embodiments, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The processor 470 may control the overall operation of each unit of the communication apparatus 400.

In some embodiments, the communication apparatus 400 may include a plurality of processors 470, or may not include the processor 470.

In the case where the communication apparatus 400 does not include the processor 470, the communication apparatus 400 may operate under control of the controller 170 or a processor of a device inside of the vehicle 100.

Meanwhile, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive apparatus 600 may further include other components in addition to the aforementioned components, or may not include some of the aforementioned components.

Meanwhile, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 610 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle dive device 600 may include its own processor.

The vehicle drive apparatus 600 may operate under control of the controller 170.

The travelling system 700 is a system for controlling the overall driving operation of the vehicle 100. The travelling system 700 may operate in the autonomous driving mode.

The travelling system 700 may include the driving system 710, the parking-out system 740, and the parking system 750.

In some embodiments, the travelling system 700 may further include other components in addition to the aforementioned components, or may not include some of the aforementioned component.

Meanwhile, the travelling system 700 may include a processor. Each unit of the travelling system 700 may include its own processor.

Meanwhile, in some embodiments, in the case where the travelling system 700 is implemented as software, the travelling system 700 may be a subordinate concept of the controller 170.

Meanwhile, in some embodiments, the travelling system 700 may be a concept including at least one selected from among the user interface apparatus 200, the object detection apparatus 300, the communication apparatus 400, the vehicle drive apparatus 600, and the controller 170.

The driving system 710 may perform driving of the vehicle 100.

The driving system 710 may perform driving of the vehicle 100 by providing a control signal to the vehicle drive apparatus 600 based on navigation information from the navigation system 770.

The driving system 710 may perform driving of the vehicle 100 by providing a control signal to the vehicle drive apparatus 600 based on information on an object received from the object detection apparatus 300.

The driving system 710 may perform driving of the vehicle 100 by providing a control signal to the vehicle drive apparatus 600 based on a signal from an external device through the communication apparatus 400.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on navigation information from the navigation system 770.

The parking-out system 740 may perform an operation of pulling the vehicle 100 out of a parking space, by providing a control signal to the vehicle drive apparatus 600 based on information on an object received from the object detection apparatus 300.

The parking-out system 740 may perform an operation of pulling the vehicle 100 out of a parking space, by providing a control signal to the vehicle drive apparatus 600 based on a signal received from an external device.

The parking system 750 may perform an operation of parking the vehicle 100 in a parking space.

The parking system 750 may perform an operation of parking the vehicle 100 in a parking space, by providing a control signal to the vehicle drive apparatus 600 based on navigation information from the navigation system 770.

The parking system 750 may perform an operation of parking the vehicle 100 in a parking space, by providing a control signal to the vehicle drive apparatus 600 based on information on an object received from the object detection apparatus 300.

The parking system 750 may perform an operation of parking the vehicle 100 in a parking space, by providing a control signal to the vehicle drive apparatus 600 based on a signal from an external device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication apparatus 400.

In some embodiments, the navigation system 770 may be classified as an element of the user interface apparatus 200.

The sensing unit 120 may sense the state of the vehicle. The sensing unit 120 may include an attitude sensor (e.g., a yaw sensor, a roll sensor, and a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, a brake pedal position sensor, etc.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply 190 may supply power required to operate each component under control of the controller 170. In particular, the power supply 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

FIG. 8A is a diagram illustrating an example of an exterior of a Head Up Display (HUD) device according to an embodiment of the present invention, and FIG. 8B is a conceptual diagram referred to for explaining a HUD device according to an embodiment of the present invention.

With reference to the drawings, a HUD device 1000 may be arranged inside the vehicle 100 and provide a user with generated information.

The HUD device 100 may be disposed in a cockpit module. The HUD device 1000 may include a cover 1001 that can be opened and closed in accordance with a user input.

The HUD device 1000 may generate a graphic object using a plurality of light emitting devices 1052 and an image forming panel 1055. The generated graphic object may be projected on a windshield WS to be displayed. In some implementations, the HUD display 1000 may further include a combiner, and a graphic object may be projected into the combiner to be displayed.

The HUD device 1000 may provide an augmented reality image.

The HUD device may include an image generation unit 1050, and a plurality of mirrors 1002 and 1003. The HUD device 1000 includes two mirrors 1002 and 1003 in the example of FIG. 8B, but it may include three or more mirrors. The plurality of mirrors may include a flat mirror 1002 and a concave mirror 1003.

The image generation unit 1050 may include a backlight unit 1051, thereby enabled to project display light of an augmented image into the windshield WS under the control of a processor 1070.

The processor 1070 may be functionally connected to an indoor camera 220, the camera 310, and the image generation unit 1050 to generate image data for composing a specific augmented image based on images provided from the indoor camera 220 and/or the camera 310 and provide the generated image data to the image generation unit 1050.

In one embodiment, the processor 1070 may detect a specific object OB, existing in front of the vehicle 100, from a front image provided from the camera 310 and provide the image generation unit 1050 with image data for composing an augmented reality image corresponding to the detected object OB.

The image generation unit 1050 may output a display light corresponding to an augmented reality image to a first mirror 1002 based on the image data provided from the processor 1070. A second mirror 1003 may allow the augmented reality image to be realized on the windshield WS, by reflecting the display light reflected by the first mirror 102. Depending on an optical path from the image generation unit 1050 to the windshield WS, size of the display light corresponding to the augmented reality image may be increased or a position of the display light projected on the windshield WS may be adjusted.

Meanwhile, the display light reflected by the second mirror 1003 may be projected within a predetermined area (hereinafter, referred to as a display region) of the windshield WS. In a display region DR, a reflective film may be attached to allow an augmented reality image ARI to be seen more clearly.

In this case, an augmented reality image is realized by the display light projected into the windshield WS, and, at a driver's position, an augmented reality image ARI may be seen as being displayed, not on the display region, but out of the vehicle 100 beyond the display region DR. That is, the augmented reality image ARI may be recognized a virtual image that is floating a predetermined distance in front of the vehicle 100. For example, the augmented reality image ARI may be a graphic object that provides information on an outline of an object OB, speed, a collision alert, etc.

For a driver to recognize the augmented reality image ARI through the display region DR when the HUD device 1000 realizes the augmented reality image ARI using a virtual image, the driver's eye has to be positioned within an eye box EB. The eye box EB is a three-dimensional indoor space in the vehicle 100, and, if the driver's eye is positioned within the eye box EB, the driver is able to see the augmented reality image ARI through the display region DR. If the driver's eye moves out of the eye box EB, the driver may see only a part of the augmented reality image ARI or none of it. In the memory 640, coordinates of the boundary of the eye box EB may be stored in advance.

Meanwhile, when the driver's eye is positioned within the eye box EB, the driver is able to recognize the augmented reality image ARI: however, there may be a difference between an actual image of the object OB recognized by the driver through the display region DR and the augmented reality image ARI due to a change in the position of the eye in the box EB. It is because a distance to the augmented reality image and a distance to the object OB are different with reference to the driver's position, and, if the distance to the object OB relatively increases, the difference from the augmented reality image ARI may gradually increase. In order to reduce or remove such a difference, the processor 1070 may perform postprocessing on the augmented reality image ARI based on the position of the eye of the driver.

Specifically, the processor 1070 may detect a position of the eye of the driver from a driver image provided from the indoor camera 220. In one embodiment, the processor 1070 detects the driver's eye from the driver image using an eye tracking technique, and calculate three-dimensional coordinates of the detected eye. In another embodiment, the processor 1070 may extract an outline of the driver's face from a driver image using an edge detection technique, and estimate a position of the driver's eye based on the extracted outline.

Information on a reference position may be preset in the memory 640, and the processor 1070 may compare a position of the driver's eye with a reference position and calculate a direction and a distance of the position of the driver's eye relative to the reference position. That is, the processor 1070 may determine how far the current position of the driver's eye is from the reference position in which direction.

The processor 1070 may determine a visual effect to be applied to postprocessing of an augmented reality image, depending on the direction and distance of the position of the driver eye relative to the reference position. Furthermore, the processor 1070 may determine a size of the determined visual effect.

By performing postprocessing on the augmented reality image ARI using the determined visual effect, the processor 1070 may reduce a difference from an actual image of an object due to a change in the position of the eye in the eye box EB and provide a more enhanced image matching result to the driver.

A visual effect applicable to postprocessing of an augmented reality image may include at least one of blurring the augmented reality image, changing a position of the augmented reality image, changing a size of the augmented reality image, or changing a gradient the augmented reality image. For example, when a horizontal difference between an augmented reality image and an actual image of an object occurs as a position of a driver's eye is changed to the left or to the right along Y axis, the processor 1070 may horizontally move the augmented reality image toward the actual image or compensate for the difference between the two images using a visual effect such as increasing a width of the augmented reality image or blurring at least one portion of the augmented reality image.

FIG. 8C is a block diagram of a HUD device according to an embodiment of the present invention.

Referring to FIG. 8C, a HUD device 1000 for a vehicle may include a communication unit 1010, an input unit 1020, an interface unit 1030, a memory 1040, an image generation unit 1050, a sound output unit 1060, a processor 1070, and a power supply 1090.

The HUD device 1000 may be included in the user interface apparatus 200.

The communication unit 1010 may include at least one communication module that enables wireless communications between the HUD device 1000 and a mobile terminal, between the HUD device 600 and an external server, or between the HUD device 1000 and another vehicle.

For example, the communication unit 1010 may form a communication channel with a user's mobile terminal through a short-ranged communication module to display information received from the mobile terminal.

The input unit 1020 may receive information from a user. Data collected from the input unit 1020 may be analyzed by the processor 1070 to be processed into the user's control command.

Meanwhile, the input unit 210, the internal camera 220, and the camera 310 included in the vehicle 100 may be classified as subordinate components of the HUD device 1000. Specifically, the input unit 1020 may include a voice input unit 211, a gesture input unit 212, a touch input unit 213, a mechanic input unit 214, and the internal camera 220.

The interface unit 1030 may receive data, information, and a signal, or transmit data, information, and a signal processed or generated in the processor 1070 to the outside. To this end, the interface unit 1030 may perform data communication with another unit, device, or system in the vehicle 100 by a wireless or wired communication method.

The interface unit 1030 may receive driving situation information.

The memory 1040 may be electrically connected to the controller 1070. The memory 1040 may store basic data for each unit of the HUD device 1000, control data for the operational control of each unit, and input/output data.

The memory 1040 may be any of various hardware storage devices, such as a ROM, a RAM, an EPROM, a flash drive, and a hard drive. The memory 1040 may store various data for the overall operation of the HUD device 1000, such as programs for the processing or control of the processor 1070.

In some embodiments, the memory 1040 may be integrally formed with the processor 1070.

Under the control of the processor 1070, the image generation unit 1050 may output display light based on image data provided from the processor 1070.

The image generation unit 1050 may include a backlight unit 1051 and an image forming panel 1055.

The backlight unit 1051 may include a plurality of light emitting devices 1052. For example, the backlight unit 1051 may include a plurality of Light Emitting Diodes (LEDs) as the plurality of light emitting devices 1052.

Each of the plurality of light emitting devices 1052 may output white light.

The plurality of light emitting devices 1052 may include a first light emitting device 1052a for outputting first light, and a second light emitting unit 1052b for outputting second light.

The plurality of light emitting devices 1052 may further include a third light emitting device 1052c for outputting third light. In this case, the first light emitting device 1052a may be arranged between the second light emitting device 1052b and the second light emitting device 1052c.

The plurality of light emitting devices 1052 may further include a fourth light emitting device 1052d for outputting fourth light.

In some implementations, the plurality of light emitting devices 1052 may further include five or more light emitting devices.

The image forming panel 1055 may form an image based on lights provided from the plurality of light emitting devices and output the image. The image forming panel 1055 may include a Liquid Crystal display (LCD) panel.

The sound output unit 1060 may convert an electric signal from the processor 1070 into an audio signal and output the audio signal. To this end, the sound output unit 1060 may include at least one speaker.

The processor 1070 may control the overall operation of each unit of the HUD device 1000.

The processor 1070 may control the image generation unit 1050. Specifically, the processor 1070 may control the plurality of light emitting devise 1052 and the image forming panel 1055.

The processor 1070 may control the plurality of light emitting devices 1052.

The processor 1070 may control turning on and off of each of the plurality of light emitting devices 1052. The processor 1070 may control light outputting of each of the plurality of light emitting devices 1052.

The processor 1070 may differently control light outputting of the first light emitting device 1052a and light outputting of the second light emitting device 1052b.

The processor 1070 may control the second light emitting device 1052b and the third light emitting device 1052c to be turned on individually or all together.

The processor 1070 may control the image forming panel 1055.

The processor 1070 may divide the image forming panel 1055 into one or more regions, and control arrangement of liquid crystals corresponding to the regions.

When uniform light is provided by a first Fly Eye Lens (FEL) to a first region of the image forming panel 1055, the processor 1070 may control the image forming panel 1055 so as to adjust arrangement of liquid crystals in the first region.

When uniform light is provided by a second sub FEL to a second region of the image forming panel 1055, the processor 1070 may control the image forming panel 1055 so as to adjust arrangement of liquid crystals in the second region.

The processor 1070 may control light outputting of the first light emitting device 1052a, and control the image forming panel 1055 to adjust arrangement of liquid crystals in the first region, thereby control brightness of an image output through the first region.

The processor 1070 may output light outputting of the second light emitting device 1052b, and control the image forming panel 1055 to adjust arrangement of liquid crystals in the second region, thereby controlling brightness of an image output through the second region.

The processor 1070 may control light outputting of the third light emitting device 1052b, and control brightness of an image output through the second region by controlling the image forming panel 1055 so as to adjust arrangement of liquid crystals in the second region.

The processor 1070 may control the first light emitting device 1052a and the image forming panel 1055 such that a first image corresponding to first information is displayed in the first region.

The processor 1070 may control the second light emitting device 1052b and the image forming panel 1055 such that a second image corresponding to second information is displayed in the second region.

The processor 1070 may control the plurality of light emitting devices 1052 and the image forming panel 1055 in response to ambient illumination information. In doing so, a user is allowed to accurately recognize displayed information, regardless of ambient illumination.

In response to ambient illumination information, the processor 1070 may control the plurality of light emitting devices 1052 and the image forming panel 1055 so as to adjust a scale of a displayed image. For example, when an ambient illumination value increases, the processor 1070 may control the first light emitting device 1052a and the image forming panel 1055 such that the image is displayed in larger size.

The processor 1070 may receive at least one of driving speed information of the vehicle 100, external object information, navigation information, or information on a user's mobile terminal through the interface unit 1030.

Based on at least one of the driving speed information, the external object information, the navigation information, or the information on the mobile terminal, the processor 1070 may determine to display an image on one of the first region and the second region of the image forming panel 1055.

Based on information on a distance to an external object, the processor 1070 may determine to display an image corresponding to the external object on the first region or the second region.

Based on information on an operation state of a mobile terminal, the processor 1070 may determine to display an image corresponding to the mobile terminal on the first region or the second region.

The processor 1070 may control the image generation unit 1050 to display an image on a determined region.

Based on a provided image, the processor 1070 may determine whether the image is to be displayed in the first region or the second region. For example, if the provided image is an augmented reality image, the processor 1070 may control the augmented reality image to be displayed in the second region. For example, if the provided image is a normal image, the processor 1070 may control the image to be displayed in the first region.

The power supply 1090 may supply power to each unit of the HUD device 1000 under the control of the processor 1070. In particular, the power supply 1090 may be supplied with power from a battery inside the vehicle 100.

FIGS. 9A and 9B are diagrams referred to for explaining an image generation unit included in a HUD device according to an embodiment of the present invention.

FIG. 9A is an exploded vide of the image generation unit according to an embodiment of the present invention, and FIG. 9B is a conceptual diagram of the image generation unit 1050.

With reference to the drawing, the image generation unit 1050 may include the backlight unit 1051, a lens system 900, and the image forming panel 1055.

The backlight unit 1051 may include a circuit board 1052 and the plurality of light emitting devices 1052.

The circuit board 1054 may include various devices mounted thereon.

The plurality of light emitting devices 1052, the communication unit 1010, the interface unit 1030, the memory 1040, the processor 1070, and the power supply 1090 may be mounted on the circuit board 1054.

The circuit board 1054 may be a Printed Circuit Board (PCB).

The plurality of light emitting devices 1052 may be mounted on the circuit board 1054.

Each of the plurality of light emitting devices 1052 may be mounted on the circuit board 1054 by direct bonding.

The plurality of light emitting devices 1052 will be described in more detail after FIG. 16.

The lens system 900 may be arranged between the backlight unit 1051 and the image forming panel 1055. Specifically, the lens system 900 may be arranged between the plurality of light emitting devise 1052 and the image forming panel 1055.

The lens system 900 may transmit light generated in the light emitting device 1052 to the image forming panel 1055.

The lens system 900 may include a collimation lens 910, an illumination lens 920 and 930, and a Fly Eye Lens (FEL) 1100.

The collimation lens 910 may be arranged between the backlight unit 1051 and the FEL 1100. The collimation lens 910 may be arranged between the light emitting devices 1052 and the FEL 1100.

The collimation lens 910 may allow light to be output from the light emitting devices 1052 in a parallel direction. Light having passed through the collimation lens 910 may have a non-uniform distribution.

The collimation lens 910 may include a first collimation lens group 911 and a second collimation lens group 912.

Since each of the plurality of light emitting devices 1052 is mounted on the circuit board 1054 by direct bonding, light generated by each of the light emitting devices 1052 is output at an angle close to 180 degrees. In this case, using a single collimation lens group is not enough to make the whole light generated by the light emitting devices 1052 to be incident on the illumination lens 920 and 930 in a parallel direction.

As the collimation lens 910 includes the first collimation lens group 911 and the second collimation lens group 912, light output at an angle close to 180 degrees is capable of being incident on the illumination lens 920 and 930 in a parallel direction.

The first collimation lens group 911 may include a plurality of collimation lenses to match the number of the plurality of light emitting devices 1052.

An incident surface of each of the plurality of collimation lens in the first collimation lens group 911 may be formed as a concave spherical surface. Due to such a shape, the first collimation lens group 911 is capable of receiving as much light generated by the light emitting devices 1052 as possible.

The first collimation lens group 911 may be arranged between the backlight unit 1051 and the second collimation lens 912. The first collimation lens group 911 may be arranged between the light emitting devices 1052 and the second collimation lens group 912.

The first collimation lens group 911 may include a plurality of collimation lens arranged to correspond to the plurality of light emitting devices 1052, respectively.

For example, the first collimation lens group 911 may include a first collimation lens corresponding to the first light emitting device, and a second collimation lens corresponding to the second light emitting device. The first collimation lens may be arranged between the first collimation lens and A collimation lens. The second collimation lens may be arranged between the second light emitting device and B collimation lens.

For example, the first collimation lens group 911 may further include a third collimation lens corresponding to the third light emitting device. The third collimation lens may be arranged between the third light emitting device and C collimation lens.

For example, the first collimation lens group 911 may further include a fourth collimation lens corresponding to the fourth light emitting device. The fourth collimation lens may be arranged between the fourth light emitting device and D illumination lens.

The second collimation lens group 912 may include a plurality of collimation lenses to matches the number of the plurality of light emitting devices 1052. Each of the plurality of collimation lenses in the second collimation lens group 912 may be an aspheric surface, and a light incident surface and a light emitting surface thereof may be convex.

The second collimation lens group 912 may be arranged between the first collimation lens group 911 and the FEL 1100.

The second collimation lens group 912 may include a plurality of collimation lenses arranged to correspond to the plurality of light emitting devices 1052, respectively.

The second collimation lens group 912 may include A collimation lens corresponding to the first light emitting device, and B collimation lens corresponding to the second light emitting device.

The A collimation lens may be arranged between the first collimation lens and the FEL 1100. For example, the A collimation lens may be arranged between the first collimation lens and a first sub FEL.

The B collimation lens may be arranged between the second collimation lens and the FEL 1100. For example, the B collimation lens may be arranged between the second collimation lens and a second sub FEL.

For example, the second collimation lens 912 may further include C collimation lens corresponding to the third light emitting device.

The C collimation lens may be arranged between the third collimation lens and the FEL 1100. For example, the B collimation lens may be arranged between the third collimation lens and a third sub FEL.

For example, the second collimation lens 912 may further include D collimation lens corresponding to a fourth light emitting device.

The D collimation lens may be arranged between the fourth collimation lens and the FEL 1100. For example, the D collimation lens may be arranged between the fourth collimation lens and a fourth sub FEL.

The illumination lens 920 and 930 may focus light passing through the FEL 1100 on the image forming panel 1055.

The illumination lens 920 and 930 may include a first illumination lens 920 and a second illumination lens 930.

The first illumination lens 920 may focus light distributed through the FEL 1100 on the second illumination lens 930. To this end, the first illumination lens 920 may be formed such that a light incident surface and a light emitting surface are convex.

A size of the first illumination lens 920 may be determined by the number of lenses included in the second collimation lens group 912. Accordingly, the first illumination lens 920 may induce light generated by the plurality of light emitting devices 0152 to the second illumination lens 930 without a leakage of light.

Alternatively, the size of the first illumination lens 920 may be determined to corresponding to a size of the FEL 1100.

The second illumination lens 930 may focus light having different angles of incidence on the image forming panel 1055. To this end, the first illumination lens 920 may have a light incident surface and a light emitting surface which are convex.

The second illumination lens 930 may be formed to be greater than the image forming panel 1055. Accordingly, the second illumination lens 930 may induce light having passed through the first illumination lens 920 to the image forming panel without a leakage of light.

FIGS. 10 to 12 are diagram referred to for explaining an FEL according to an embodiment of the present invention.

With reference to the drawings, the FEL 1100 may have a plurality of optic pattern s formed to correspond to the plurality of light emitting devices 1052, respectively.

The FEL 1100 may include a plurality of cells 1101 and provide uniform light to the image forming panel 105 by causing light, which is provided from at least one of the plurality of light emitting devices 1052 to at least some of the plurality of cells 1101, to expand to a predetermined size.

Specifically, the FEL 1100 may divide incident light through the plurality of cells 1101, and cause each divided light to expand to a predetermined size such that uniform light is emitted. The plurality of cells 1101 may respectively provide uniform light having respectively passed through the plurality of cells 1101 to an area (or a region) of a predetermined size on the image forming panel 1055.

The FEL 1100 may include a plurality of sub FELs 1110a and 1110b having a plurality of optic patterns.

Hereinafter, the plurality of sub FELs will be described with reference to FIGS. 11 and 12. The FEL 1100 may include the first sub FEL 1110a and the second sub FEL 1110b.

The first sub FEL 1110*a* may have a first optic pattern formed thereon, which induces a first light output from the first light emitting device 1052*a* is uniformly provided to a first region RG1 of the image forming panel 1055.

The first sub FEL 1110*a* may include first group cells 1101*a*. A size of the first group cells 1101*a* may correspond to the first region RG1. For example, the size of the first group cells 1101*a* may be in proportion to the size of the first region RG1.

The first group cells 1101*a* are an optic pattern composed of a plurality of unit cells 1101*a*. A first optic pattern may be realized by the first group cells 1101*a*.

The first sub FEL 1110*a* may induce light to be uniformly provided to the first region of the image forming panel 1055. The first region RG1 may be a region having a first area in the image forming panel 1055.

The second sub FEL 1110*b* may have a second optic pattern formed thereon, which induces a second light output from the second light emitting device 1052*b* to be uniformly provided to a second region RG2 of the image forming panel 1055. The second region RG2 may have a size different from the size of the first region RG1.

The second sub FEL 1110*b* may include second group cells 1101*b*. The size of the second group cells 1101*b* may correspond to the size of the second region RG2. For example, the size of the second group cells 1101*b* may be in proportion to the size of the second region RG2.

The second group cells 1101*b* are an optic pattern composed of a plurality of unit cells 1101*b*. A second optic pattern may be realized by the second group cells 1101*b*.

The second sub FEL 1110*b* may induce light to be uniformly provided to the second region of the image forming panel 1055. The second region RG2 may be a region having a second area in the image forming panel 1055.

The first region and the second region may have different sizes. For example, the size of the second region may be greater than the size of the first region. That is, the second region RG2 may be greater than the first region RG1.

FIG. 13 is a diagram referred to for explaining an area of an image forming panel corresponding to a cell size of an FEL according to an embodiment of the present invention.

Referring to FIG. 13, the first sub FEL 1110*a* may include the first group cells 1101*a*. Each first group cell 1101*a* may have a first width cw1 and a first height ch1.

Each first group cell 1101*a* may function as a lens.

The first region RG1 of the image forming panel 1055 may be determined by the first sub FEL 1110*a*.

Specifically, a width W1 and a height H1 of the first region RG1 may be determined by the first height cw1 and the first height ch1 of each first group cell 1101*a*. For example, the width W1 of the first region RG1 is determined to be a value that is obtained by multiplying the width magnification of each first group cell 1101*a* to the first width cw1 of each first group cell 1101*a*. In addition, the height H1 of the first region RG1 is determined to be a value obtained by multiplying the height magnification of the first group cell 1101*a* to the first height ch1 of the first group cell 1101*a*.

The second sub FEL 1110*b* may include the second group cells 1101*b*. Each second group cell 1101*b* may have a second width cw2 and a second height ch2.

Each second group cell 1101*b* may function as a lens.

The second region RG2 of the image forming panel 1055 may be determined by the second sub FEL 1110*b*.

Specifically, a width W2 and a height H2 of the second region RG2 may be determined by the second width cw2 and the second height ch2 of each second group cell 1101*b*. For example, the width w2 of the second region RG2 may be determined to be a value that is obtained by multiplying a width magnification of each second group cell 1101*b* to the second width cw2 of each second group cell 1101*b*. In addition, the height H2 of the second region RG2 is determined to be a value that is obtained by multiplying the height magnification of each second group cell 1101*b* to the second height c2 of each second group cell 1101*b*.

Meanwhile, the FEL 1100 may further include a third sub FEL 1110*c*.

The third sub FEL 1110*c* may have a third optic pattern formed thereon, which induces third light output from the third light emitting device 1052*c* to be uniformly provided to the second region RG2 of the image forming panel 1055. In this case, the third optic pattern of the third sub FEL 1110*c* may be identical to the second optic pattern of the second sub FEL 1110*b*.

The third sub FEL 1110*c* may include third group cells 1101*c*. The size of the third group cells 1101*c* may correspond to the size of the second region RG2. For example, the size of the third group cells 1101*c* may be in proportion to the size of the second region RG2. The size of the third group cells 1101*c* may be identical to the size of the second group cells 1101*b*. In addition, the number of the third group cells 1101*c* may be identical to the number of the second group cells 1101*b*.

The description about the second group cells 1101*b* of the second sub FEL 1110*b* may apply to the size of the third group cells of the third sub FEL 1110*c* and the size of the second region RG2.

Meanwhile, the plurality of sub FELs 1110*a*, 1110*b*, and 1110*c* may be integrally formed with each other to realize the FEL 1100.

Meanwhile, the plurality of sub FELs 1110*a*, 1110*b*, and 1110*c* may be formed individually to realize the FEL 1100.

FIG. 14 is a diagram referred to for explaining various regions dependent on various optic patterns of an FEL in an image forming panel according to an embodiment of the present invention.

Referring to FIG. 14, the image forming panel 1055 may include a plurality of regions. Each of the plurality of regions may be distinguished based on the FEL 1100.

For example, a size of each of the plurality of regions may be determined by a size of cells in each group of each sub FEL included in the FEL 1100.

For example, a position of each of the plurality of regions may be determined by a position of each sub FEL included in the FEL 1100.

For example, the number of the plurality of regions may be determined by the number of sub FELs included in the FEL 1100.

As illustrated in FIG. 14(*a*), the image forming panel 1055 may include a region 1410, b region 1420, and c region 1430. In this case, the plurality of light emitting devices 1052 may include at least three individual light emitting devices, and the FEL 1100 may include at least three sub FELs. For example, the FEL 1100 may include a sub FEL, b sub FEL, and c sub FEL.

The a region 1410 may be formed to correspond to the a sub FEL. The a region 1410 may be a region corresponding to the entire the image forming panel 1055.

The b region 1410 may be formed to correspond to the b sub FEL. The b region 1420 may be formed in the left side of the image forming panel 1055.

The c region 1430 may be formed to correspond to the c sub FEL. The c region 1430 may be formed in the right side of the image forming panel 1055.

As illustrated in FIG. 14(b), the image forming panel 1055 may include a region 1410, d region 1440, e region 1450, and f region 1460. In this case, the plurality of light emitting devices 1052 may include at least four individual light emitting devices, and the FEL 1100 may include at least four sub FELs. For example, the FEL 1100 may include a sub FEL, d sub FEL, e sub FEL, and f sub FEL.

The a region 1410 may be formed to correspond to the a sub FEL. The a region 1410 may be a region corresponding to the entire image forming panel 1055.

The d region 1440 may be formed to correspond to the d sub FEL. The d region 1440 may be formed over the upper part of the image forming panel 1055.

The e region 1450 may be formed to correspond to the e sub FEL. The e region 1450 may be formed under the image forming panel 1055.

The f region 1460 may be formed to correspond to the f sub FEL. The f region 1460 may be formed in the central portion of the image forming panel 1055.

FIGS. 15A to 15C are exemplary diagrams referred to for explaining an operation of how a picture is implemented in a HUD device according to an embodiment of the present invention.

In the drawings, the plurality of light emitting devise 1052 is exemplarily depicted as including first light emitting device 1052a, the second light emitting device 1052b, and the third light emitting device 1052c. In addition, the FEL 1100 is exemplarily depicted as including a first sub FEL 1110a, a second sub FEL 1110b, and a third sub FEL 1110c.

FIG. 15A is a diagram referred to for explaining an operation of how a first picture SN1 is implemented by the first light emitting device 1052a and the first sub FEL 1110a according to an embodiment of the present invention. In FIG. 15A, the HUD device 100 implements a smaller picture compared to FIG. 15B.

Referring to FIG. 15A, based on received information, data, and a signal, the processor 1070 may control light to be output from the first light emitting device 1052a. The processor 170 may control white light to be output.

The light output from the first light emitting device 1052a travels in a parallel direction by passing through the first collimation lens 911a and the A collimation lens 912a.

The light having passed through the first collimation lens 911a and the A collimation lens 912a may be incident on the first sub FEL 1110a.

The light incident on the first sub FEL 1110a expands to a predetermined size corresponding to the first region RG1, while passing through the respective group cells 1101a of the first sub FEL 1110a. In addition, the light incident on the first sub FEL 1110a becomes uniform while passing through the respective group cells 1101a of the first sub FEL 1110a.

The light emitted from the first sub FEL 1110a is incident on the image forming panel 1055. In particular, the light emitted from the first sub FEL 1110a is incident on the first region RG1 of the image forming panel 1055.

The processor 1070 may control the image forming panel 1055 so as to adjust arrangement of liquid crystals in the first region RG1. For example, by controlling arrangement of liquid crystals, the processor 1070 may realize display light to generate an image in the outside.

The processor 1070 may control the image forming panel 1055 such that arrangement of liquid crystals in a region other than the first region RG1 is maintained.

The first region RG1 of the image forming panel 1055 may be a region corresponding a part of the entire region of the image forming panel 1055. In this case, light may be provided with output power smaller than power provided to the entire region. Accordingly, when light is provided only to the first region RG1, more efficiency may be achieved compared to when light is provided to the entire region.

In the case of implementing a picture of the same brightness, when light is provided only to the first region RG1, the picture may be implemented with less energy consumption, compared to when light is provided to the entire region. In addition, in this case, less heat occurs in light emitting devices, and thus, it is more advantageous in terms of thermal management.

FIG. 15B is a diagram referred to for explaining an operation of how a second picture SN2 is implemented by the second light emitting device 1052b, the second sub FEL 1110b, the third light emitting device 1052c, and the third sub FEL 1110c according to an embodiment of the present invention. In FIG. 15B, the HUD device 100 implements a larger picture compared to FIG. 15A.

Referring to FIG. 15B, based on received information, data, and a signal, the processor 1070 may control light to be output from the second light emitting device 1052b and the third light emitting device 1052c. In some implementations, the processor 1070 may control light to be output from any one of the second light emitting device 1052b and the third light emitting device 1052c. The processor 1070 may control white light to be output.

The light output from the second light emitting device 1052b travels in a parallel direction by passing through the second collimation lens 911b and the B collimation lens 912b. The light having passed through the second collimation lens 911b and the B collimation lens 912b is incident on the second sub FEL 1110b.

The light incident on the second sub FEL 1110b expands to a predetermined size corresponding to the second region RG2, while passing through the respective group cells 1101a of the second sub FEL 1110b. In addition, the light incident on the second sub FEL 1110b becomes uniform while passing through the respective group cells 1101b of the second sub FEL 1110b.

The light emitted from the second sub FEL 1110b is incident on the image forming panel 1055. In particular, the light emitted from the second sub FEL 1110b is incident on the second region RG2 of the image forming panel 1055.

The light output from the third light emitting device 1052c travels in a parallel direction by passing through the third collimation lens 911c and the C collimation lens 912c. The light having passed through the third collimation lens 910c and the C collimation lens 912c is incident on the third sub FEL 1110c.

The light incident on the third sub FEL 1110c expands to a predetermined size corresponding to the second region RG2, while passing through the respective group cells of the third sub FEL 1110c. In addition, the light incident on the third sub FEL 1110c becomes uniform while passing through the respective group cells of the third sub FEL 1110c.

The light emitted from the third sub FEL 1110c is incident on the image forming panel 1055. In particular, the light emitted from the third sub FEL 1110c is incident on the second region RG2 of the image forming panel 1055.

The processor 1070 may control the image forming panel 1055 so as to adjust arrangement of liquid crystals in the second region RG2. For example, by controlling arrangement of liquid crystals, the processor 1070 may realize a display light to generate an image in the outside.

The second region RG2 is greater than the first region RG1. In order to display an image with the same brightness, the second region RG2 needs a greater amount of light than that for the first region RG1. Accordingly, an amount of light required for the second region RG2 may be provided using the second light emitting device 1052b and the third light emitting device 1052c.

FIG. 15C is a diagram referred to for explaining an operation of how a third picture SN3 is implemented by the first to third light emitting devices 1051a to 1051c and the first to third sub FELs 1110a to 1110c according to an embodiment of the present invention.

Referring to FIG. 15C, based on received information, data, and a signal, the processor 1070 may control light to be output from the first to third light emitting devices 1051a to 1051c.

The light output from the first to third light emitting devices 1051a to 1051c is incident on the image forming panel 1055 along a path described above with reference to FIGS. 15A and 15B.

The light output from the first light emitting device 1051a and having passed through the first sub FEL 1110a is incident on the first region RG1.

The light output from the second light emitting device 1051b and having passed through the second sub FEL 1110b is incident on the second region RG2.

The light output from the third light emitting device 1051c and having passed through the third sub FEL 1110c is incident on the second region RG2.

The processor 1070 may control the image forming panel 1055 so as to adjust arrangement of liquid crystals in the first region RG1 and the second region RG2.

In this case, the processor 1070 may control the image forming panel 1055 so as to display, in the first region RG1, an image that is required to be clearly recognized by a user. For example, when a notification needs to be provided to a driver during driving, the processor 1070 may provide a warning image through the first region RG1.

Since the image provided through the first region RG1 is implemented by light output from the first to third light emitting devices 1051a to 1051c, the image may be displayed brighter than an image provided through a region other than the first region RG1 in the second region RG2. In this case, the image provided through the first region RG1 is more visible FIGS. 16 and 17 are diagrams referred to for explaining a light emitting device according to an embodiment of the present invention.

FIG. 16 illustrates an example of a light emitting device according to a related part.

Referring to FIG. 16, a light emitting device 1600 according to a related art is configured such that an LED chip 1690 is bonded onto a body 1670 for insulation and housing and surrounded by a partition wall 1680 to contain phosphorous resin 1695.

Since a plurality of layers from a circuit board 1610 to the LED chip 1690 is arranged in this structure, thermal resistance is increased and therefore heat dissipation efficiency is deteriorated.

In addition, despite the same size of LED chips, a primary lens (e.g., a collimation lens) for primarily receiving light has a large size because a light emitting surface has a large area.

Accordingly, optical efficiency of a lighting system having the plurality of light emitting devices arranged therein is deteriorated.

In addition, since a first electrode 1612 and a second electrode 1613 needs to be arranged under the light emitting device 15600 according to the related art, an insulation layer 1611 is further required, and a heat dissipation structure is vulnerable because a thermal pad 1621 is small or not provided.

FIG. 17 is a diagram illustrating an example of a light emitting device 1052 according to an embodiment of the present invention.

Referring to FIG. 17, the light emitting device 1052 according to an embodiment of the present invention may be bonded directly to the circuit board 1054. For example, the light emitting device 1052 may be bonded to the circuit board by direct bonding.

Each of the light emitting devices 1052 may include a Light Emitting Diode (LED) chip 1730.

The LED chip 1730 may be bonded to the circuit board 1720 by a bonding layer 1710.

A second electrode (e.g., a positive (+) electrode) and a thermal pad 1720 may be arranged under the LED chip 1730.

A phosphorous layer 1740 may be arranged on the LED chip 1730.

Meanwhile, a first electrode (e.g., a negative (−) electrode 1750) may be disposed on the circuit board 1720 with being spaced apart from the LED chip 1730.

The insulation layer 1760 may be arranged between the first electrode 1750 and the circuit board 1720.

The structure of the light emitting device 1052 shown in FIG. 17 may be referred to as a direct bonding structure.

Since the LED chip 1730 is bonded directly to the circuit board, thermal resistance may be reduced, and therefore, the light emitting device 1052 according to an embodiment of the present invention may improve heat dissipation efficiency.

In addition, since only the second electrode is disposed between the LED chip 1730 and the circuit board 1054, an insulation layer is not required under the LED chip 1730 in the light emitting device 1052 according to an embodiment of the present invention. In addition, a wider area of a thermal pad can be used, and thus, heat dissipation efficiency is improved compared to the light emitting device 1600 in FIG. 16.

In addition, as the size of the LED chip 1730 is used as an emitting area, a size of the primary lens (e.g., the collimation lens 910) is smaller than a size of the light emitting device 1600 in FIG. 16, and therefore, optical efficiency of a lighting system may improve. That is, the light emitting device 1052 is advantageous in that the light emitting device 1052 implements a HUD device for vehicle with a small size compared to FIG. 16 and maintains the same optical efficiency as that in FIG. 16.

FIG. 18 is a diagram referred to for explaining a backlight unit according to an embodiment of the present invention.

Referring to FIG. 18, the backlight unit 1051 may include the circuit board 1054 and the plurality of light emitting devices 1052a, 1052b, and 1052c.

Although FIG. 18 illustrates an example in which the backlight unit 1051 includes three light emitting devices 1052a, 1052b, and 1052c, the backlight unit 1051 may include four or more light emitting devices.

Meanwhile, a gap between the plurality of light emitting devices 1052a, 1052b, and 1052c may be referred to as A gap between the plurality of light emitting devices 1052a, 1052b, and 1052c may determine by a size of an LED chip 1730 (see FIG. 17) included in each of the plurality of light emitting devices 1052a, 1052b, and 1052c.

As described above with reference to FIG. 17, an emitting area of each of the plurality of light emitting devices 1052a, 1052b, and 1052c is determined by the size of the LED chip 1730.

In addition, a size of a collimation lens 910 (see FIG. 9A) may be determined by the size of the LED chip 1730.

The HUD device 1000 includes a plurality of collimation lenses 910 respectively corresponding to the plurality of light emitting devices.

A gap between the light emitting devices 1052a, 1052b, and 1052c is correlated to a space where each of the plurality of collimation lenses is arranged.

For example, for the plurality of collimation lenses to cover the whole light generated by the plurality of light emitting devices 1052a, 1052b, and 1052c, a space where the plurality of collimation lenses is not allowed to intervene each other is needed.

For this reason, the size of the collimation lens 910 is determined by the size of the LED chip.

The collimation lens 910 may include a first collimation lens group 911 (see FIG. 9) and a second collimation lens group 912 (see FIG. 9).

The first collimation lens 911 may include a plurality of collimation lenses, the number of which matches with the number of the plurality of light emitting devise 1052.

For example, the first collimation lens group 911 may include a first collimation lens, a second collimation lens, and a third collimation lens.

The first collimation lens may be disposed to correspond to the first light emitting device 1052a. For example, the first collimation lens may be disposed to cover the whole light output from the first light emitting device 1052a.

The second collimation lens may be disposed to correspond to the second light emitting device 1052b. For example, the second collimation lens may be disposed to cover the whole light output from the second light emitting device 1052b.

The third collimation lens may be disposed to correspond to the third light emitting device 1052c. For example, the third collimation lens may be disposed to cover the whole light output from the third light emitting device 1052c.

In some embodiments, the first collimation lens group 911 may further include a fourth collimation lens.

The fourth collimation lens may be disposed to correspond to a fourth light emitting device. For example, the fourth collimation lens may be disposed to cover the whole light output from the fourth light emitting device.

The second collimation lens 912 may include A collimation lens, B collimation lens, and C collimation lens.

The A collimation lens may correspond to the third light emitting device 1052a.

A size of the A collimation lens may be determined by a first gap pa between the first light emitting device 1052a and the second light emitting device 1052b. For example, a diameter of the A collimation lens may be identical to the first gap pa. As the diameter of the A collimation lens is identical to the first gap pa, a volume occupied by the second collimation lens 912 may be minimized.

A size of the A collimation lens may be determined by a second gap pb between the first light emitting device 1052a and the third light emitting device 1052c. For example, a diameter of the A collimation lens may be identical to the second gap pb. Due to this structure, a volume occupied by the second collimation lens 912 may be minimized.

The B collimation lens may correspond to the second light emitting device.

A size of the B collimation lens may be determined by the first gap pa between the first light emitting device 1052a and the second light emitting device 1052b. for example, a diameter of the B collimation lens may be identical to the first gap pa. Due to this structure, a volume occupied by the second collimation lens 912 may be minimized.

The C collimation lens may correspond to the third light emitting device.

A size of the C collimation lens may be determined by the second gap pb between the first light emitting device 1052a and the third light emitting device 1052c. For example, a diameter of the C collimation lens may be identical to the second gap pb. Due to this structure, a volume occupied by the second collimation lens 912 may be minimized.

Meanwhile, light output from the first light emitting device 1052a and having passed through the first collimation lens and the A collimation lens may have a first optical axis.

Light output from the second light emitting device 1052b and having passed through the second collimation lens and the B collimation lens may have a second optical axis.

Light output from the third light emitting device 1052c and having passed through the third collimation lens and the C collimation lens may have a third optical axis.

The first optical axis, the second optical axis, and the third optical axis may be parallel to each other.

Meanwhile, a FEL 1100 (see FIG. 13) may have a first sub FEL 1110a (see FIG. 13) having a first optic pattern formed thereon, a second sub FEL 1110b having a second optic pattern formed thereon, and a third sub FEL 1110c (see FIG. 13) having a third optic pattern formed thereon.

A size of the first optic pattern may be determined by the first gap pa between the first light emitting device 1052a and the second light emitting device 1052b. For example, a width of the first sub FEL 1110a may be determined by the first gap pa. For example, a cell width of the first FEL 1110a may be determined by the first gap pa.

A size of the first optic pattern may be determined by the second gap pb between the first light emitting device 1052a and the third light emitting device 1052c. For example, a width of the first sub FEL 1110a may be determined by the first gap pa. For example, a cell width of the first FEL 1110a may be determined by the first gap pa.

A size of the second optic pattern may be determined by the first gap pa between the first light emitting device 1052a and the second light emitting device 1052b. For example, a width of the second sub FEL 1110b may be determined by the first gap pa. For example, a cell width of the second sub FEL 1110b may be determined by the first gap pa.

A size of the third optic pattern may be determined by the second gap pb between the first light emitting device 1052a and the third light emitting device 1052c. For example, a width of the third sub FEL 1110c may be determined by the second gap pb. For example, a cell width of the third sub FEL 1110c may be determined by the second gap pb.

FIGS. 19 to 21 are diagrams referred to for explaining a HUD device in the case where a plurality of light emitting devices forms an array according to an embodiment of the present invention.

FIG. 19 is a diagram referred to for explaining a pitch, an emitting area, an entire emitting area, and an effective area.

Referring to FIG. 19, a plurality of light emitting devices 1052a, 1052b, 1052c, and 1052d may form an array 1053.

On the array 1053, a gap between the plurality of light emitting devise 1052a, 1052b, 1052c, and 1052d in a transverse direction may be defined as a first pitch p1.

On the array 1053, a gap between the plurality of light emitting devise 1052a, 1052b, 1052c, and 1052d in a longitudinal direction may be defined as a second pitch p2.

An area of light provided from each of the light emitting devices 1052a, 1052b, 1052c, and 1052d to a lens system 900 may be determined by a size of an LED chip 1730. Since the LED chip 1730 is mounted to the circuit board 1054 by direct bonding, the area of the light from each light emitting device may be determined by the size of the LED chip 1730.

An emitting area may be defined as a value that is obtained by multiplying an emission width w to an emission height h. Herein, the emission width w may be a width of the LED chip 1730 as viewed from above. The emission height h may be a height of the LED chip 1730 as viewed from above.

The entire emitting area of the plurality of light emitting devices 1052a, 1052b, 1052c, and 1052d may be defined as a value that is obtained by multiplying a total emission width Ws and a total emission height Hs.

The image forming panel 1055 may have an effective area 1055a. The effective area 1055a may be defined as an area which light generated by the light emitting devices 1052 reaches on the light forming panel 1055 through the lens system 900.

The effective area 1055a may be defined as a value that is obtained by multiplying a width Wp of the effective area and a height Hp of the effective area.

A gap between a plurality of light emitting devices may be determined by a size of the array 1053.

For example, the first pitch p1 may be determined by the size of the array 1053.

For example, the second pitch p2 may be determined by the size of the array 1053.

While the number of the plurality of light emitting devices is determined, a gap between the plurality of light emitting devices may be determined by a whole emitting area Ws*Hs. The whole emitting area Ws*Hs may be determined by the size of the array 1053. Accordingly, the gap between the plurality of light emitting devices may be determined by the size of the array 1053.

FIGS. 20A to 20C is a diagram referred to for explaining an effective angle of a light emitting device according to an embodiment of the present invention.

The term "effective angle" in this specification may be defined as an angle of a light which reaches at an effective area 1055 in the image forming panel out of lights output from light emitting devices. A light output beyond a range of the effective angle will be lost.

FIG. 20a illustrates an example of an effective angle of the light emitting device 1600 in FIG. 16.

The light emitting device 1600 in FIG. 16 has an effective area greater than an effective area of the light emitting device 1052 in FIG. 17, and therefore, if the light emitting device 1600 uses a collimation lens 1910 in the same size as that of the collimation lens of the light emitting device 1052 in FIG. 17, the light emitting device 1600 in FIG. 16 may have an effective angle 1020 in a range of 90 degrees.

FIG. 20B illustrates an example of an effective angle of the light emitting device 1052 in FIG. 17.

The light emitting device 1052 in FIG. 17 has an effective area smaller than an effective area of the light emitting device 1600 in FIG. 16, and therefore, if the light emitting device 1052 uses the collimation lens 1910 in the same size as that of the light emitting device 1600 in FIG. 16, the light emitting device 1052 may have an effective angle 2030 close to 180 degrees.

Since the HUD device 1000 is disposed in a cockpit module of the vehicle 100, the HUD device 100 needs to be miniaturized for freedom of design.

To implement the HUD device 1000 with an effective angle of 180 degrees, the light emitting device 1600 in FIG. 16 needs to have a collimation lens, which is greater than that of the light emitting device 1052 in FIG. 17, and an image forming panel, and thus the light emitting device 1600 is disadvantageous in miniaturization. In addition, there is a problem in that brightness (luminescence) of a generated image is low because the effective area 1055a is inevitably large.

On the other hand, the light emitting device 1052 according to an embodiment of the present invention may have an effective angle of 180 degrees even with a relatively small-sized collimation lens. Accordingly, the HUD device according to an embodiment of the present invention is advantageous in miniaturization. In addition, there is another advantage in that brightness (luminescence) of a generated image is high because the effective area 1055a can be maintained to a predetermined size.

FIG. 21 is a diagram referred to for explaining a relationship between the plurality of light emitting devices 1052 and the image forming panel 1055 according to an embodiment of the present invention.

A size of the image forming panel 1055 may be determined by the effective area 1055a.

The image forming panel 1055 is formed to be as large as the effective area 1055a or a larger than the effective area 1055a by a predetermined size.

The size of the image forming panel 1055 may be determined by a size of an LED chip 1730 (see FIG. 17).

The size of the effective area 1055a is determined by the size of the LED chip 1730 (see FIG. 17). An emitting area of each of the plurality of light emitting devices 1052 is determined by the size of the LED chip 1730.

A size of a collimation lens 910 is determined by the emitting area of each of the plurality of light emitting devices 1052. The size of the collimation lens 910 may be determined by the size of the LED chip 1730.

A size of the effective area 1055a formed on the basis of a light having passed through an FEL 1100 is determined by the emitting area of each of the plurality of light emitting devices 1052. The size of the effective area 1055a is determined by the size of the LED chip 1730.

The size of the image forming panel 1055 may be determined by gaps p1 and p2 between the plurality of light emitting devices 1052.

The size of the effective area 1055a is determined by the gap p1 and p2 between the plurality of light emitting devices 1052. The size of the array is determined by the gap p1 and p2 between the plurality of light emitting devices 1052.

The size of the image forming panel 1055 may be determined by the size of the array.

The size of the effective area 1055a is determined by the size of the array.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

What is claimed is:

1. A Head Up Display (HUD) device for a vehicle, the device comprising:
    a plurality of light emitting devices;
    an image forming panel configured to generate an image based on light provided from the plurality of light emitting devices and output the image;
    a lens system arranged between the plurality of light emitting devices and the image forming panel and configured to transmit light generated by the plurality of light emitting devices to the image forming panel; and
    a processor configured to control the plurality of light emitting devices and the image forming panel,
    wherein each of the plurality of light emitting devices is mounted to a circuit board by direct bonding,
    wherein the lens system comprises:
        a first collimation lens group comprising a plurality of collimation lenses arranged to correspond to the plurality of light emitting devices, respectively,
        a second collimation lens group comprising a plurality of collimation lenses arranged to correspond to the plurality of light emitting devices, respectively,
        a Fly Eye Lens (FEL) configured to define a plurality of optic patterns corresponding to the plurality of light emitting devices, respectively,
        a first illumination lens configured to transmit light from the FEL, and
        a second illumination lens configured to transmit light from the first illumination lens and to focus light having different incidence angles onto the image forming panel,
    wherein the first illumination lens is configured to focus light distributed in the FEL onto the second illumination lens,
    wherein the first collimation lens group is arranged between the plurality of light emitting devices and the second collimation lens group,
    wherein the first collimation lens group and the second collimation lens group are configured to orient light from the light emitting devices to a direction parallel to an optical axis,
    wherein the plurality of light emitting devices comprises:
        a first light emitting device configured to output first light;
        a second light emitting device configured to output second light, and
        a third light emitting device configured to output third light, and
    wherein the FEL comprises:
        a first sub FEL comprising first group cells that have a first optic pattern and that are configured to transmit the first light to a first region of the image forming panel,
        wherein a size of the first region is determined by a size of the first group cells,
        a second sub FEL comprising second group cells that have a second optic pattern and that are configured to transmit the second light to a second region of the image forming panel, wherein a size of the second region is determined by a size of the second group cells, and is greater than the size of the first region, and
        a third sub FEL comprising third group cells that have a third optic pattern and that are configured to transmit the third light to the second region of the image forming panel.

2. The device of claim 1, wherein each of the light emitting devices comprises a Light Emitting Diode (LED) chip.

3. The device of claim 2, wherein a gap between the plurality of light emitting devices are determined by a size of the LED chip.

4. The device of claim 2, wherein the plurality of light emitting devices forms an array, and
    wherein a gap between the plurality of light emitting devices are determined by a size of the array.

5. The device of claim 2, wherein an area of light provided from the plurality of light emitting devices to the lens system is determined by a size of the LED chip.

6. The device of claim 1,
    wherein the first collimation lens group comprises a first collimation lens, and
    wherein the first collimation lens covers whole light output from the first light emitting device.

7. The device of claim 1,
    wherein the first light emitting device is arranged between the second light emitting device and the third light emitting device, and
    wherein the second collimation lens group comprises A collimation lens corresponding to the first light emitting device, and
    wherein a size of the A collimation lens is determined by a first gap between the first light emitting device and the second light emitting device or a second gap between the second light emitting device and the third light emitting device.

8. The device of claim 1,
    wherein the first collimation lens group comprises:
        a first collimation lens corresponding to the first light emitting device; and
        a second collimation lens corresponding to the second light emitting device,
    wherein the second collimation lens group comprises:
        A collimation lens corresponding to the first light emitting device; and
        B collimation lens corresponding to the second light emitting device, and
    wherein a first optical axis of light output from the first light emitting device and having passed through the first collimation lens and the A collimation lens, and a second optical axis of light, output from the second light emitting device and having passed through the second collimation lens and the B collimation lens are parallel to each other.

9. The device of claim 1, wherein the first group cells, the second group cells, and the third group cells are configured to transmit the first light, the second light, and the third light, respectively, into uniform light to the image forming panel and to expand the first light, the second light, and the third light into predetermined sizes on the image forming panel.

10. The device of claim 1, wherein the first light emitting device is arranged between the second light emitting device and the third light emitting device, and
  wherein a size of the first optic pattern is determined by a first gap between the first light emitting device and the second light emitting device or a second gap between the second light emitting device and the third light emitting device.

11. The device of claim 1, wherein the first sub FEL, the second sub FEL, and the third sub FEL are integrally formed with each other.

12. The device of claim 1, wherein the first illumination lens and the second illumination lens comprise a light incident surface and a light emitting surface that are convex.

13. The device of claim 1, wherein a size of the first illumination lens is determined by a number of the plurality of collimation lenses included in the second collimation lens group.

14. The device of claim 1, wherein a size of the second illumination lens is greater than a size of the image forming panel.

15. The device of claim 2, wherein the plurality of light emitting devices forms an array, and
  wherein a size of the image forming panel is determined by a size of the LED chip, a gap between the plurality of light emitting devices, or a size of the array.

16. A vehicle comprising the HUD device of claim 1.

17. The device of claim 1, wherein the first collimation lens group is spaced apart from the plurality of light emitting devices in a first direction, and
  wherein the second collimation lens group is spaced apart from the first collimation lens group in the first direction.

18. The device of claim 1, wherein the FEL is arranged between the second collimation lens group and the first illumination lens along the optical axis, and
  wherein the second illumination lens is arranged between the first illumination lens and the image forming panel along the optical axis.

19. The device of claim 18, wherein an illumination lens distance between the first illumination lens and the second illumination lens is greater than a first distance between the FEL and the first illumination lens, and
  wherein the illumination lens distance is greater than a second distance between the second illumination lens and the image forming panel.

20. The device of claim 1, wherein the first sub FEL is disposed between the second sub FEL and the third sub FEL, and
  wherein the second optical pattern and the third optical pattern are identical to each other and different from the first optical pattern.

* * * * *